United States Patent
Chen et al.

(10) Patent No.: US 10,802,267 B2
(45) Date of Patent: Oct. 13, 2020

(54) PROJECTION APPARATUS AND ILLUMINATION SYSTEM

(71) Applicant: Coretronic Corporation, Hsin-Chu (TW)

(72) Inventors: Chang-Hsuan Chen, Hsin-Chu (TW); Chien-Chung Liao, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/547,520

(22) Filed: Aug. 21, 2019

(65) Prior Publication Data

US 2020/0064620 A1    Feb. 27, 2020

(30) Foreign Application Priority Data

Aug. 23, 2018 (CN) .......................... 2018 1 0965509

(51) Int. Cl.
*G03B 21/20* (2006.01)
*G02B 26/00* (2006.01)
*F21V 13/08* (2006.01)

(52) U.S. Cl.
CPC ............ *G02B 26/008* (2013.01); *F21V 13/08* (2013.01); *G03B 21/204* (2013.01)

(58) Field of Classification Search
CPC .... G03B 21/006; G03B 21/008; G03B 21/28; G03B 21/142; G03B 21/204; G03B 21/208; H04N 9/3111; H04N 9/3114; H04N 9/3117; H04N 9/3158; H04N 9/3182; H04N 9/3197; F21V 13/08; F21V 13/12; F21V 13/14
See application file for complete search history.

(56) References Cited

U.S. PATENT DOCUMENTS

2013/0021582 A1* 1/2013 Fujita ................... G03B 21/204
                                                                353/31
2014/0347634 A1* 11/2014 Bommerbach ...... H04N 9/3158
                                                                353/31

(Continued)

FOREIGN PATENT DOCUMENTS

| CN | 104020634 | 9/2017 |
|---|---|---|
| CN | 105676576 | 11/2017 |
| TW | I509344 | 11/2015 |

*Primary Examiner* — Sultan Chowdhury
(74) *Attorney, Agent, or Firm* — JCIPRNET

(57) ABSTRACT

A projection apparatus and an illumination system are provided. The illumination system includes an excitation light source and a light wavelength conversion module. The excitation light source is adapted to provide an excitation beam. The light wavelength conversion module includes a first phosphor wheel and a second phosphor wheel. The second phosphor wheel is disposed adjacent to the first phosphor wheel, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam. The illumination system of the invention avails improving phosphor conversion efficiency and avoiding burning the phosphor powder. The projection apparatus has good performance.

22 Claims, 23 Drawing Sheets

(56) References Cited

U.S. PATENT DOCUMENTS

| | | | |
|---|---|---|---|
| 2015/0267880 A1* | 9/2015 | Hadrath | G03B 21/204 362/84 |
| 2017/0059975 A1* | 3/2017 | Aizaki | G03B 33/12 |
| 2018/0259839 A1* | 9/2018 | Okuda | G03B 33/12 |
| 2018/0299110 A1* | 10/2018 | Asano | G03B 21/204 |

* cited by examiner

PROJECTION APPARATUS AND ILLUMINATION SYSTEM

CROSS-REFERENCE TO RELATED APPLICATION

This application claims the priority benefit of China application serial no. 201810965509.8, filed on Aug. 23, 2018. The entirety of the above-mentioned patent application is hereby incorporated by reference herein and made a part of this specification.

BACKGROUND OF THE INVENTION

Field of the Invention

The invention relates to an optical device and an optical system, and particularly relates to a projection apparatus and an illumination system.

Description of Related Art

Projection apparatus generally adopts light-emitting elements in collaboration with a light wavelength conversion module (for example, a phosphor layer) to produce light beams for illumination. However, the phosphor layer may absorb external energy. Under irradiation of a high energy light beam (for example, a laser light beam), the temperature of the phosphor layer is increased, which results in reduction of phosphor conversion efficiency, or even burning of the phosphor layer.

The information disclosed in this "BACKGROUND OF THE INVENTION" section is only for enhancement of understanding of the background of the described technology and therefore it may contain information that does not form the prior art that is already known to a person of ordinary skill in the art. The information disclosed in this "BACKGROUND OF THE INVENTION" section does not represent the problems to be resolved by one or more embodiments of the present invention, and it also does not mean that the information is acknowledged by a person of ordinary skill in the art before the application of the present invention.

SUMMARY OF THE INVENTION

The invention is directed to an illumination system, which avails improving conversion efficiency of phosphor powder and avoids burning of the phosphor powder.

The invention is directed to a projection apparatus, which has good performance.

Other objects and advantages of the invention may be further illustrated by the technical features broadly embodied and described as follows.

In order to achieve one or a portion of or all of the objects or other objects, an embodiment of the invention provides an illumination system. The illumination system includes an excitation light source and a light wavelength conversion module. The excitation light source is adapted to provide an excitation beam. The light wavelength conversion module includes a first phosphor wheel and a second phosphor wheel. The second phosphor wheel is disposed adjacent to the first phosphor wheel, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam.

In order to achieve one or a portion of or all of the objects or other objects, an embodiment of the invention provides a projection apparatus. The projection apparatus includes the aforementioned illumination system, a display device and a projection lens. The display device is disposed on a transmission path of an illumination beam output from the illumination system, and the display device converts the illumination beam into an image beam. The projection lens is disposed on a transmission path of the image beam.

Based on the above description, the embodiments of the invention have at least one of following advantages and effects. In an embodiment of the illumination system of the invention, by disposing a plurality of phosphor wheels together on the transmission path of the excitation beam coming from the excitation light source, the excitation beam received by each of the phosphor wheels is a part of (not all of) the excitation beam coming from the excitation light source (i.e. an irradiation area of the excitation beam on each of the phosphor wheels is less than a total irradiation area of the excitation beam, and energy of the excitation beam received by each of the phosphor wheels is less than energy of the excitation beam coming from the excitation light source), so as to reduce energy of a light spot projected to each of the phosphor wheels. Therefore, the illumination system of the embodiment of the invention is adapted to improve phosphor conversion efficiency and avoid burning the phosphor powder, and the projection apparatus of the invention has good performance.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
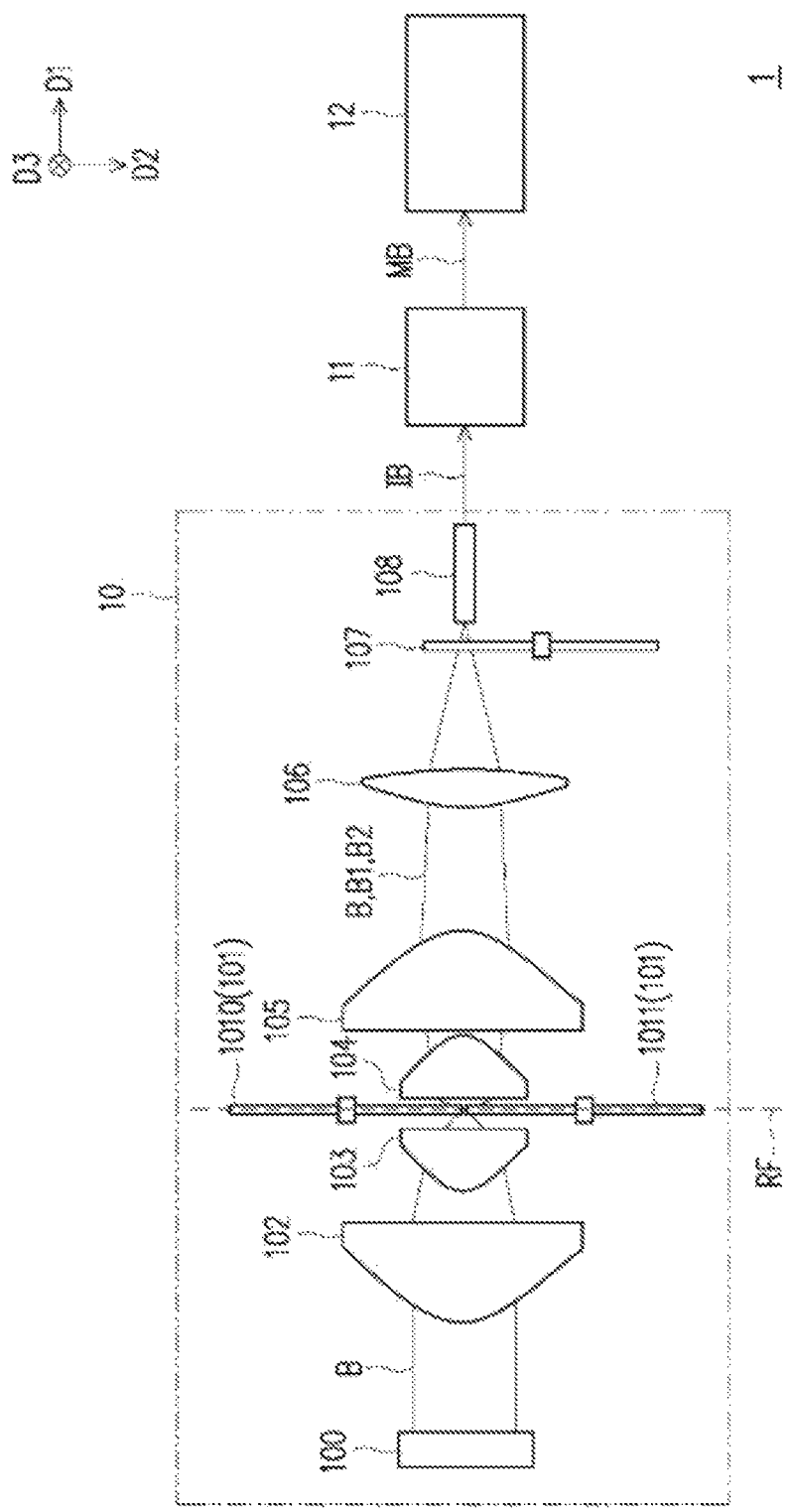
FIG. 1A is a schematic diagram of a projection apparatus according to a first embodiment of the invention.

FIG. 1A is a schematic diagram of a projection apparatus according to a first embodiment of the invention. Referring to FIG. 1A, a projection apparatus 1 of the first embodiment of the invention includes an illumination system 10, a display device 11 and a projection lens 12.

In detail, the illumination system 10 includes an excitation light source 100 and a light wavelength conversion module 101. The excitation light source 100 is adapted to provide an excitation beam B. For example, the excitation light source 100 includes a plurality of light-emitting elements. The light-emitting elements may include a plurality of laser diodes, a plurality of light-emitting diodes (LEDs) or a combination of the above two light-emitting elements.

The light wavelength conversion module 101 includes a first phosphor wheel 1010 and a second phosphor wheel 1011. The second phosphor wheel 1011 is disposed adjacent to the first phosphor wheel 1010. For example, the first phosphor wheel 1010 and the second phosphor wheel 1011 are located on the same reference plane RF, and the second phosphor wheel 1011 is close to but does not contact the first phosphor wheel 1010, so as to maintain an independent operation (for example, a rotation function). An arrangement direction of the first phosphor wheel 1010 and the second phosphor wheel 1011 is perpendicular to a direction along which the excitation beam B is incident to the light wavelength conversion module 101. In the embodiment, the arrangement direction of the first phosphor wheel 1010 and the second phosphor wheel 1011 is perpendicular to a light transmission direction (for example, a first direction D0 of the excitation beam B transmitted between the excitation light source 100 and the light wavelength conversion module 101. In the embodiment, when viewing from the excitation light source 100 to the light wavelength conversion module 101, the first phosphor wheel 1010 and the second phosphor wheel 1011 are arranged longitudinally (for example, arranged along a second direction D2). Namely, the first phosphor wheel 1010 and the second phosphor wheel 1011 are respectively arranged at an upper side and a lower side of an optical axis (not shown) of the illumination system 10. However, the arrangement direction of the first phosphor wheel 1010 and the second phosphor wheel 1011 may be changed according to an actual requirement. For example, the first phosphor wheel 1010 and the second phosphor wheel 1011 may also be arranged laterally (for example, arranged along a third direction D3). Namely, the first phosphor wheel 1010 and the second phosphor wheel 1011 are respectively arranged at a left side and a right side of the optical axis of the illumination system 10. Alternatively, the first phosphor wheel 1010 and the second phosphor wheel 1011 may also be arranged obliquely. For example, an angle may be included between the second direction D2 (or the third direction D3) and the arrangement direction of the first phosphor wheel 1010 and the second phosphor wheel 1011. The angle is greater than 0 degrees and smaller than 90 degrees. In the following embodiments, the arrangement direction of the phosphor wheels may be ameliorated according to the above methods, and detail thereof is not repeated.

Figure 1B:
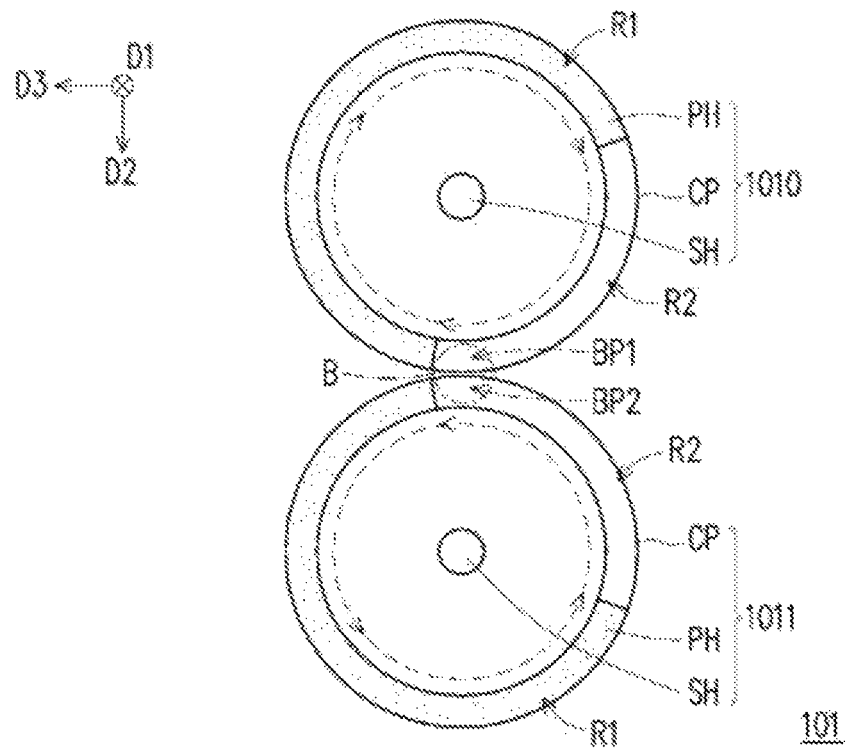
FIG. 1B is a front view of a first phosphor wheel and a second phosphor wheel of FIG. 1A.

FIG. 1B is a front view of the first phosphor wheel 1010 and the second phosphor wheel 1011 of FIG. 1A. Referring to FIG. 1A and FIG. 1B, the first phosphor wheel 1010 and the second phosphor wheel 1011 are respectively disposed on transmission paths of a first part BP1 and a second part BP2 of the excitation beam B, such that during a period that the excitation light source 100 is turned on, the first phosphor wheel 1010 and the second phosphor wheel 1011 are both irradiated by the excitation beam B. In other words, during the period that the excitation light source 100 is turned on, the first phosphor wheel 1010 and the second phosphor wheel 1011 are all irradiated by the excitation beam B, and the excitation beams B irradiating the first phosphor wheel 1010 and the second phosphor wheel 1011 are respectively different parts of the excitation beam B coming from the excitation light source 100.

In the embodiment, since the first phosphor wheel 1010 and the second phosphor wheel 1011 are located on the same reference plane RF, the first phosphor wheel 1010 and the second phosphor wheel 1011 are simultaneously irradiated by the excitation beam B during the period that the excitation light source 100 is turned on.

In detail, each of the first phosphor wheel 1010 and the second phosphor wheel 1011 includes a carrier plate CP, a phosphor layer PH and a rotation shaft SH. The carrier plate CP is adapted to carry the phosphor layer PH. For example, the carrier plate CP may be a transparent carrier plate or a metal carrier plate. The carrier plate CP includes a light conversion region R1 and a non-light conversion region R2. The light conversion region R1 and the non-light conversion region R2 are disposed along a circumferential direction of the carrier plate CP to surround the rotation shaft SH. The phosphor layer PH is disposed in the light conversion region R1 and exposes the non-light conversion region R2. Namely, the phosphor layer PH does not cover the non-light conversion region R2. The carrier plate CP is adapted to rotate around the rotation shaft SH, such that the light conversion region R1 and the non-light conversion region R2 are alternately cut into the transmission path of the excitation beam B.

In the embodiment, the first phosphor wheel 1010 and the second phosphor wheel 1011 are all transmissive phosphor wheels. Correspondingly, the carrier plate CP is a transparent carrier plate, and the non-light conversion region R2 is a light penetration region. The light penetration region may have a light diffusing characteristic (for example, to configure a diffuser, though the invention is not limited thereto). The first phosphor wheel 1010 and the second phosphor wheel 1011 are adapted to rotate along opposite directions, such that the non-light conversion region R2 of the first phosphor wheel 1010 and the non-light conversion region R2 of the second phosphor wheel 1011 are synchronously (and simultaneously) cut into the transmission path of the excitation beam B. Further, the non-light conversion region R2 of the first phosphor wheel 1010 and the non-light conversion region R2 of the second phosphor wheel 1011 are respectively cut into the transmission paths of the first part BP1 and the second part BP2 of the excitation beam B, such that the first part BP1 and the second part BP2 respectively pass through the non-light conversion region R2 of the first phosphor wheel 1010 and the non-light conversion region R2 of the second phosphor wheel 1011 and are transmitted toward the display device 11 together.

On the other hand, the light conversion region R1 of the first phosphor wheel 1010 and the light conversion region R1 of the second phosphor wheel 1011 are synchronously (and simultaneously) cut into the transmission path of the excitation beam B. Further, the light conversion region R1 of the first phosphor wheel 1010 and the light conversion region R1 of the second phosphor wheel 1011 are respectively cut into the transmission paths of the first part BP1 and the second part BP2 of the excitation beam B, such that the phosphor layer PH of the first phosphor wheel 1010 and the phosphor layer PH of the second phosphor wheel 1011 respectively convert the first part BP1 and the second part BP2 into a first converted beam B1 and a second converted beam B2, and the first converted beam B1 and the second converted beam B2 respectively pass through the light conversion region R1 of the first phosphor wheel 1010 and the light conversion region R1 of the second phosphor wheel 1011 and are transmitted toward the display device 11 together.

The first converted beam B1 and the second converted beam B2 have at least partially overlapped spectra. In the embodiment, the excitation beam B is a blue beam, and the first converted beam B1 and the second converted beam B2 are all yellow beams. Namely, the spectrum of the first converted beam B1 and the spectrum of the second converted beam B2 may be completely overlapped. However, the number of the light conversion regions in the phosphor wheel and the color of the converted beam (a type and composition of the phosphor powder) may be changed according to an actual requirement, which is not limited by the invention. For example, the phosphor layer may further include light diffusing particles, quantum dots or a combination thereof. Moreover, each of the phosphor wheels may include a plurality of light conversion regions, such as at least two of a red light conversion region, a green light conversion region and a yellow light conversion region.

According to different requirements, the illumination system 10 may further include other elements. For example, the illumination system 10 may further include a plurality of lens elements (for example, a lens element 102, a lens element 103, a lens element 104, a lens element 105 and a lens element 106), so as to achieve a function of converging or collimating a light beam. Moreover, the illumination system 10 may further include a filter module 107, so as to improve purity of the light beam output from the illumination system 10. Furthermore, the illumination system 10 may further include a light uniforming element 108, so as to improve uniformity of the light beam output from the illumination system 10. For example, the light uniforming element 108 is a light integration rod, though the invention is not limited thereto.

The lens element 102 is disposed on a transmission path of the excitation beam B coming from the excitation light source 100. The lens element 103 is disposed on a transmission path of the excitation beam B coming from the lens element 102. The light wavelength conversion module 101 is disposed on a transmission path of the excitation beam B coming from the lens element 103. The lens element 104 is disposed on a transmission path of the light beams (including the excitation beam B, the first converted beam B1 and the second converted beam B2) coming from the light wavelength conversion module 101. The lens element 105 is disposed on a transmission path of the light beams coming from the lens element 104. The lens element 106 is disposed on a transmission path of the light beams coming from the lens element 105. The filter module 107 is disposed on a transmission path of the light beams coming from the lens element 106. The light uniforming element 108 is disposed on a transmission path of the light beams coming from the filter module 107.

Figure 1C:
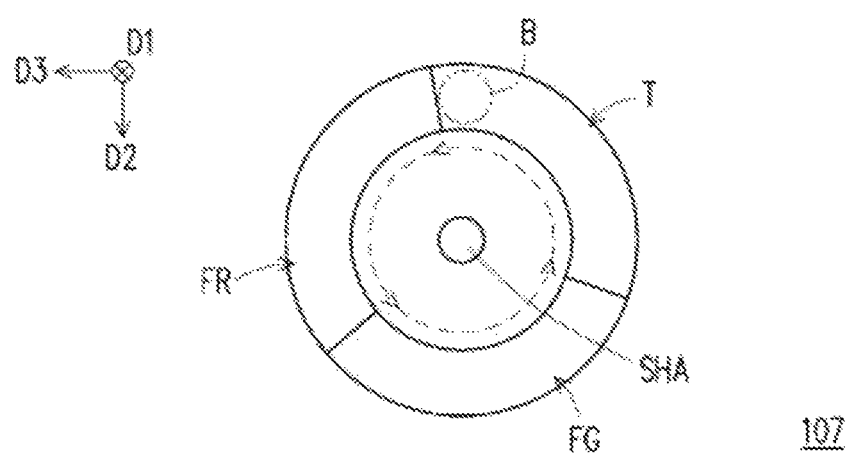
FIG. 1C is a front view of a filter module in FIG. 1A.

FIG. 1C is a front view of the filter module 107 in FIG. 1A. Referring to FIG. 1B and FIG. 1C, the filter module 107 has a plurality of optical regions, such as a light penetration region T, a green filter region FG and a red filter region FR. However, the number of the optical regions may be changed according to an actual requirement, and is not limited to the above number.

The light penetration region T, the green filter region FG and the red filter region FR are disposed along a circumferential direction of the filter module 107 to surround a rotation shaft SHA of the filter module 107. The filter module 107 is adapted to rotate around the rotation shaft SHA, such that the light penetration region T, the green filter region FG and the red filter region FR are alternately cut into the transmission path of the light beams coming from the lens element 106. The light penetration region T of the filter module 107 is adapted to allow at least a part of the excitation beam B (for example, a blue beam) to pass through. For example, the light penetration region T may be configured with a blue filter or no filter. The green filter region FG of the filter module 107 is adapted to allow a green beam to pass through and filter other colors of light beams. For example, the green filter region FG may be configured with a green filter. The red filter region FR of the filter module 107 is adapted to allow a red beam to pass through and filter other colors of light beams. For example, the red filter region FR may be configured with a red filter.

In detail, the filter module 107 is adapted to rotate synchronously with the first phosphor wheel 1010 and the second phosphor wheel 1011. Within a first time interval, the non-light conversion region R2 of the first phosphor wheel 1010 is cut into the transmission path of the first part BP1, the non-light conversion region R2 of the second phosphor wheel 1011 is cut into the transmission path of the second part BP2, and the light penetration region T of the filter module 107 is cut into the transmission path of the light beam (for example, the excitation beam B) coming from the lens element 106. The first part BP1 of the excitation beam B transmitted to the non-light conversion region R2 of the first phosphor wheel 1010 sequentially passes through the non-light conversion region R2 of the first phosphor wheel 1010, the lens element 104, the lens element 105, the lens element 106, the light penetration region T of the filter module 107 and the light uniforming element 108, and is then output from the illumination system 10. Moreover, the second part BP2 of the excitation beam B transmitted to the non-light conversion region R2 of the second phosphor wheel 1011 sequentially passes through the non-light conversion region R2 of the second phosphor wheel 1011, the lens element 104, the lens element 105, the lens element 106, the light penetration region T of the filter module 107 and the light uniforming element 108, and is then output from the illumination system 10. In other words, the light beam output from the illumination system 10 is a blue beam within the first time interval.

Within a second time interval, the light conversion region R1 of the first phosphor wheel 1010 is cut into the transmission path of the first part BP1, the light conversion region R1 of the second phosphor wheel 1011 is cut into the transmission path of the second part BP2, and the green filter region FG of the filter module 107 is cut into the transmission path of the light beam (for example, the first converted beam B1 and the second converged beam B2) coming from the lens element 106. The first part BP1 (for example, the blue beam) of the excitation beam B is converted into the first converted beam B1 (for example, the yellow beam) after passing through the light conversion region R1 of the first phosphor wheel 1010. The first converted beam B1 sequentially passes through the lens element 104, the lens element 105 and the lens element 106, and is transmitted to the filter module 107. The green beam in the first converted beam B1 passes through the green filter region FG of the filter module 107, and the other colors of light beam (for example, the red beam) in the first converted beam B1 is filtered by the green filter region FG of the filter module 107. The green beam passing through the green filter region FG then passes through the light uniforming element 108, and is then output from the illumination system 10. Moreover, the second part BP2 (for example, the blue beam) of the excitation beam B is converted into the second converted beam B2 (for example, the yellow beam) after passing through the light conversion region R1 of the second phosphor wheel 1011. The second converted beam B2 sequentially passes through the lens element 104, the lens element 105 and the lens element 106, and is transmitted to the filter module 107. The green beam in the second converted beam B2 passes through the green filter region FG of the filter module 107, and the other colors of light beam (for example, the red beam) in the second converted beam B2 is filtered by the green filter region FG of the filter module 107. The green beam passing through the green filter region FG then passes through the light uniforming element 108, and is then output from the illumination system 10. In other words, the light beam output from the illumination system 10 is the green beam within the second time interval.

Within a third time interval, the light conversion region R1 of the first phosphor wheel 1010 is cut into the transmission path of the first part BP1, the light conversion region R1 of the second phosphor wheel 1011 is cut into the transmission path of the second part BP2, and the red filter region FR of the filter module 107 is cut into the transmission path of the light beam (for example, the first converted beam B1 and the second converged beam B2) coming from the lens element 106. The transmission path of the converted beam (including the first converted beam B1 and the second converted beam B2) before reaching the filter module 107 may refer to related description of the second time interval, and detail thereof is not repeated. The red beam in the converted beam transmitted to the filter module 107 passes through the red filter region FR of the filter module 107, and the other colors of light beam (for example, the green beam) in the converted beam is filtered by the red filter region FR of the filter module 107. The red beam passing through the red filter region FR then passes through the light uniforming element 108, and is output from the illumination system 10. In other words, the light beam output from the illumination system 10 is the red beam within the third time interval.

According to the above description, the illumination system 10 may cut out a plurality of time intervals (for example, the first time interval to the third time interval) according to the number of the optical regions in the filter module 107, and the illumination system 10 outputs different colors of beams (for example, the blue beam, the green beam and the red beam) during different time intervals. These different colors of beams construct an illumination beam IB shown in FIG. 1A. In the embodiment, the illumination system 10 has three time intervals, and the illumination system 10 respectively outputs the blue beam, the green beam and the red beam within the three time intervals. However, the number of the time intervals, the color output within each of the time intervals, the sequence of the output colors, duration of each of the time intervals, etc., may be changed according to an actual requirement.

Referring to FIG. 1A, the display device 11 is disposed on a transmission path of the illumination beam IB output from the illumination system 10, and the display device 11 converts the illumination beam IB into an image beam MB. For example, the display device 11 may include at least one light valve. The light valve may be a digital micro-mirror device (DMD), a liquid-crystal-on-silicon panel (LCOS panel) or a transmissive liquid crystal panel, though the invention is not limited thereto.

The projection lens 12 is disposed on a transmission path of the image beam MB, so as to project the image beam MB onto a screen or other imageable objects. The projection lens 12 may be implemented by an existing projection lens, and detail thereof is not repeated.

In the embodiment, by disposing a plurality of phosphor wheels (including the first phosphor wheel 1010 and the second phosphor wheel 1011) together on the transmission path of the excitation beam B coming from the excitation light source 100, the excitation beam B received by each of the phosphor wheels is only a part of the excitation beam B (not all of the excitation beam B) coming from the excitation light source 100, so as to decrease the energy of the light spot projected to each of the phosphor wheels. Further, as shown in FIG. 1B, an irradiation area (referring to an area of the first part BP1) of the excitation beam B on the first phosphor wheel 1010 is smaller than a total irradiation area (referring to an area of the excitation beam B) of the excitation beam B, and an irradiation area (referring to an area of the second part BP2) of the excitation beam B on the second phosphor wheel 1011 is smaller than the total irradiation area (referring to an area of the excitation beam B) of the excitation beam B. In other words, the first phosphor wheel 1010 and the second phosphor wheel 1011 both share the irradiation area/energy of the excitation beam B coming from the excitation light source 100 (i.e. the energy of the excitation beam B received by each of the phosphor wheels is smaller than the energy of the excitation beam B coming from the excitation light source 100). Therefore, the illumination system 100 may improve the phosphor conversion efficiency and avoid burning the phosphor powder, and the projection apparatus 1 has good performance. Moreover, since the energy of the light spot on each of the phosphor wheels may be effectively decreased, the excitation light source 100 in the illumination system 100 may adopt a high-power excitation light source. Furthermore, compared to the method of adopting two illumination systems to reduce the energy of the light spot, the embodiment of the invention may simplify an optical design framework and reduce the number of required components.

In the following embodiments, the same or similar components are denoted by the same or similar referential numbers, and related descriptions (for example, configuration relationships, materials or effects) of the same components are not repeated.

Figure 2A:
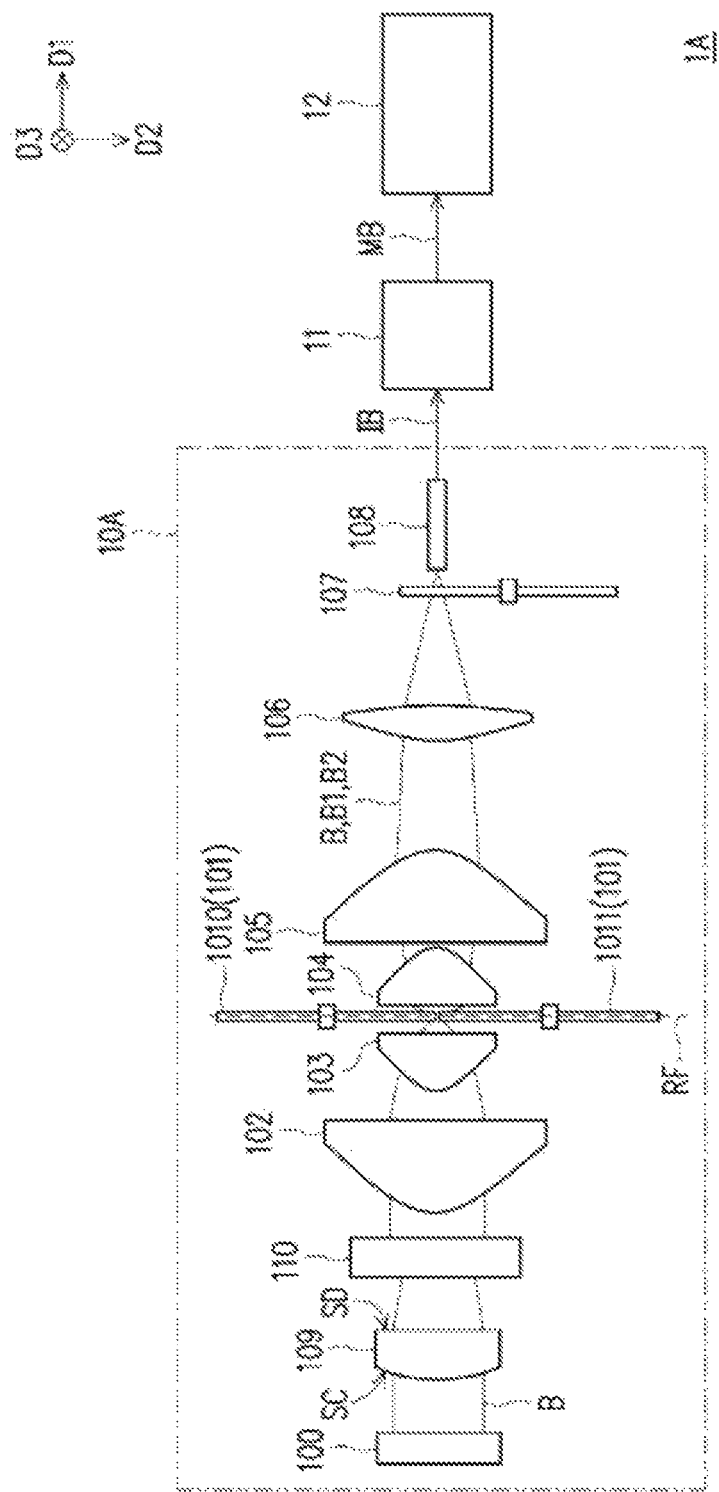
FIG. 2A is a schematic diagram of a projection apparatus according to a second embodiment of the invention.

FIG. 2A is a schematic diagram of a projection apparatus according to a second embodiment of the invention. Referring to FIG. 2A, main differences between a projection apparatus 1A of the second embodiment and the projection apparatus 1 of FIG. 1A are described as follows. In the projection apparatus 1A, the illumination system 10A further includes a multidirectional element 109 and a lens element 110.

The multidirectional element 109 is disposed on the transmission path of the excitation beam B coming from the excitation light source 100 and located between the excitation light source 100 and the light wavelength conversion module 101. In the embodiment, the multidirectional element 109 is located between the excitation light source 100 and the lens element 110.

The multidirectional element 109 has a curved surface SC and a multidirectional plane SD. The multidirectional plane SD and the curved surface SC are opposite to each other. For example, the curved surface SC is located between the excitation light source 100 and the multidirectional plane SD, though the invention is not limited thereto. The multidirectional element 109 is adapted to converge the excitation beam B coming from the excitation light source 100 to the lens element 110. Therefore, the curved surface SC of the multidirectional element 109 is a convex surface.

Figure 2B:
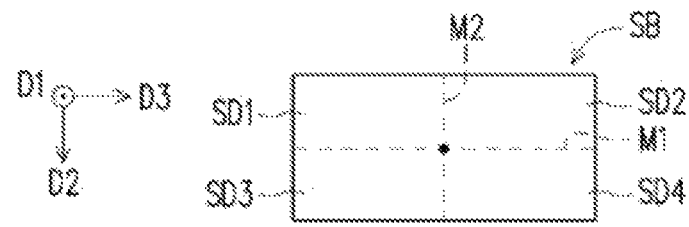
FIG. 2B is a front view of a multidirectional plane of FIG. 2A.
Figure 2C:
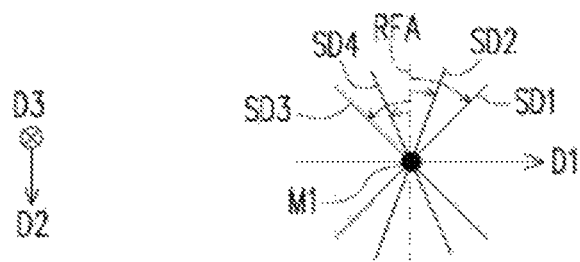
FIG. 2C is a side view of a plurality of sub-planes of the multidirectional plane of FIG. 2B, which is used for explaining facing directions of the sub-planes.
Figure 2D:
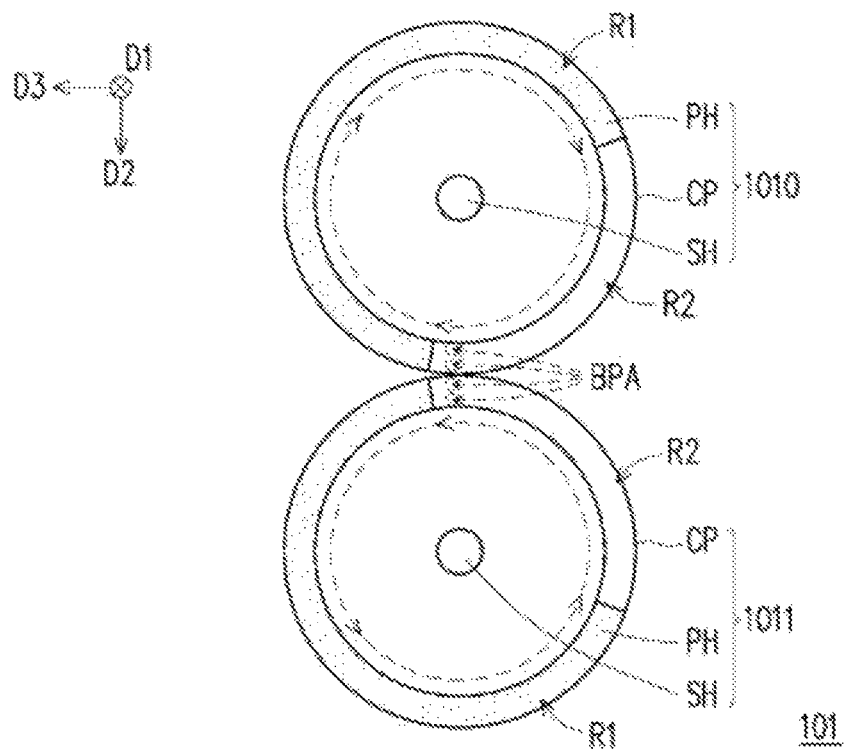
FIG. 2D is a front view of a first phosphor wheel and a second phosphor wheel of FIG. 2A.

FIG. 2B is a front view of the multidirectional plane SD of FIG. 2A. FIG. 2C is a side view of a plurality of sub-planes of the multidirectional plane SD of FIG. 2B, which is used for explaining facing directions of the sub-planes. FIG. 2D is a front view of the first phosphor wheel 1010 and the second phosphor wheel 1011 of FIG. 2A. Referring to FIG. 2A to FIG. 2D, the multidirectional plane SD includes a plurality of sub-planes facing different directions, such as a sub-plane SD1, a sub-plane SD2, a sub-plane SD3 and a sub-plane SD4. The excitation beam B coming from the light source 100 is separated into a plurality of sub-beams (not shown) by the sub-planes. Moreover, by controlling rotation angles of the sub-planes, the sub-beams may be refracted to different positions of the phosphor wheel, so as to form a plurality of light spots SPA separated from each other at different positions of the phosphor wheel, as shown in FIG. 2D.

In the embodiment, the sub-plane SD1 and the sub-plane SD2 are located at the same side of a first middle line M1 of the multidirectional plane SD, and the sub-plane SD1 and the sub-plane SD2 are respectively located at opposite sides of a second middle line M2 of the multidirectional plane SD. Moreover, the sub-plane SD3 and the sub-plane SD4 are located at the same side of the first middle line M1, and the sub-plane SD3 and the sub-plane SD4 are respectively located at opposite sides of the second middle line M2. Furthermore, the sub-plane SD1 and the sub-plane SD3 are located at the same side of the second middle line M2, and the sub-plane SD2 and the sub-plane SD4 are located at the same side of the second middle line M2. The sub-plane SD1 and the sub-plane SD2 are respectively formed by rotating a reference plane RFA of FIG. 2C by different angles clockwise along the first middle line M1. Moreover, the sub-plane SD3 and the sub-plane SD4 are respectively formed by rotating the reference plane RFA of FIG. 2C by different angles counterclockwise along the first middle line M1. In the embodiment, a rotating angle of each of the sub-planes is greater than 0 degrees and smaller than or equal to 4 degrees. If the clockwise rotation is represented by a positive value, and the counterclockwise rotation is represented by a negative value, the rotated angles of the sub-planes may be selected from one of the following combinations: ±0.5 degrees and ±1.5 degrees, ±1 degree and ±2.5 degrees, ±1.5 degrees and ±2.5 degrees, ±1 degree and ±3 degrees, or ±1.5 degrees and ±4 degrees.

By configuring the multidirectional element 109 and controlling the rotating angles of the sub-planes, the excitation beam B coming from the excitation light source 100 may be effectively separated into a plurality of sub-beams, and the sub-beams are respectively converged to different positions of the first phosphor wheel 1010 and the second phosphor wheel 1011. In this way, light loss caused by a gap between the two phosphor wheels may be effectively reduced.

It should be noted that, in the multidirectional element 109, the number of the sub-planes, a configuration relationship between the sub-planes and a rotating manner may be changed according to an actual requirement, and are not limited by the above description.

The lens element 110 is disposed on a transmission path of the excitation beam B coming from the multidirectional element 109. For example, the lens element 110 may be a collimating lens, though the invention is not limited thereto.

Figure 3A:
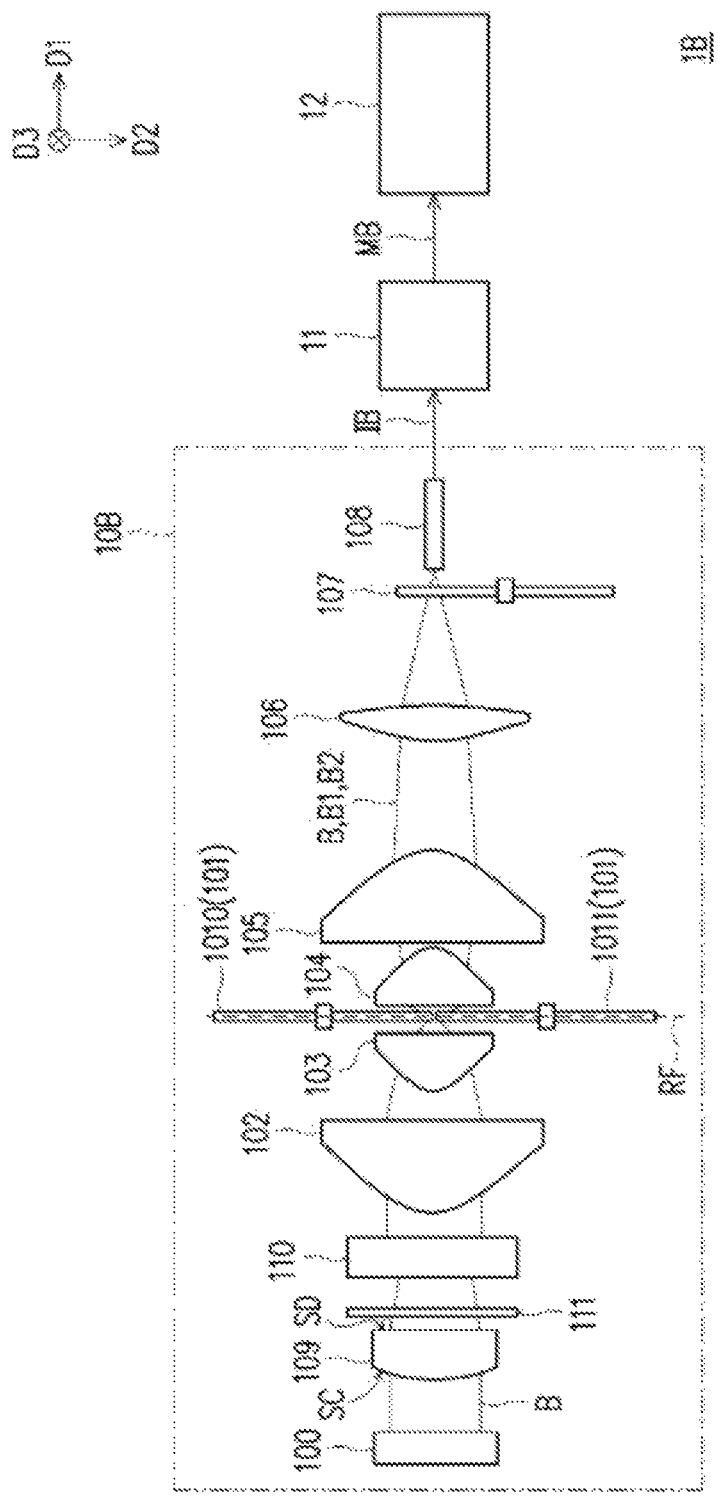
FIG. 3A is a schematic diagram of a projection apparatus according to a third embodiment of the invention.
Figure 3B:
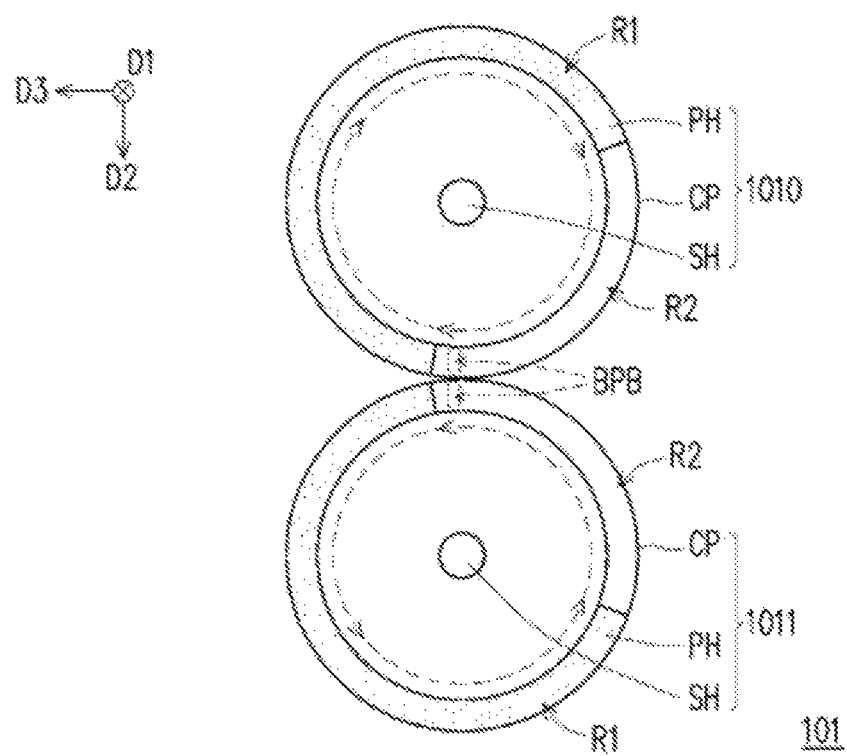
FIG. 3B is a front view of a first phosphor wheel and a second phosphor wheel of FIG. 3A.

FIG. 3A is a schematic diagram of a projection apparatus according to a third embodiment of the invention. FIG. 3B is a front view of a first phosphor wheel and a second phosphor wheel of FIG. 3A. Referring to FIG. 3A, main differences between a projection apparatus 1B of the third embodiment and the projection apparatus 1A of FIG. 2A are as follows. In the projection apparatus 1B, the illumination system 10B further includes a light diffusing element 111. The light diffusing element 111 is disposed on the transmission path of the excitation beam B coming from the multidirectional element 109 and located between the multidirectional element 109 and the light wavelength conversion module 101. In the embodiment, the light diffusing element 111 is located between the multidirectional element 109 and the lens element 110.

Referring to FIG. 3B, configuration of the light diffusing element (for example, the light diffusing element 111 of FIG. 3A) avails diffusing the light spots, such that the light spots projected to each of the phosphor wheels (for example, the first phosphor wheel 1010 and the second phosphor wheel 1011) is changed from the plurality of light spots BPA shown in FIG. 2D into an equivalent light spot BPB with a larger distribution area, as that shown in FIG. 3B. Therefore, configuration of the light diffusing element avails further decreasing the energy of the light spot projected to each of the phosphor wheels. For example, the light diffusing element may be a diffuser, though the invention is not limited thereto.

Figure 4:
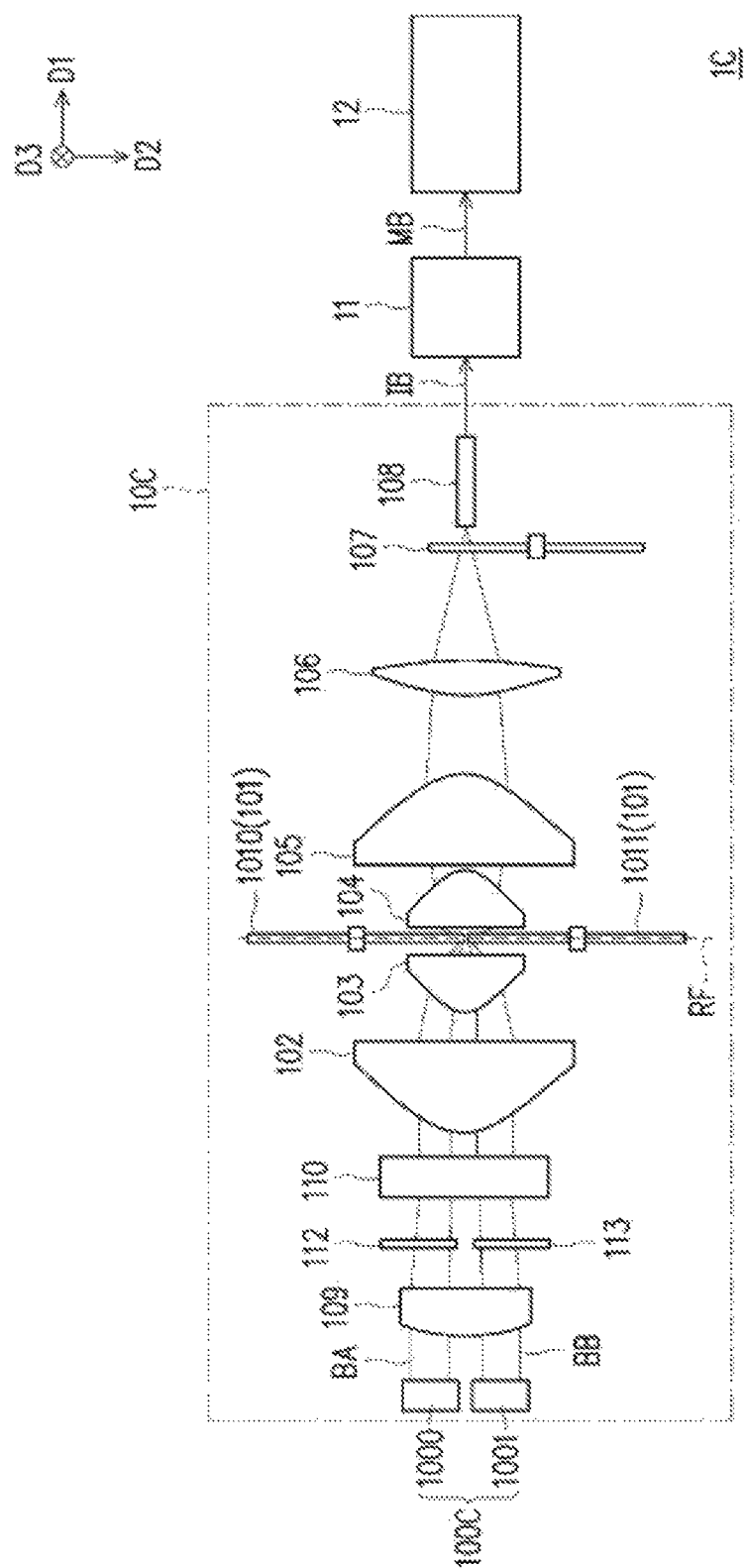
FIG. 4 to FIG. 7 are schematic diagrams of projection apparatuses according to a fourth embodiment to a seventh embodiment of the invention.

FIG. 4 to FIG. 7 are schematic diagrams of projection apparatuses according to a fourth embodiment to a seventh embodiment of the invention. Referring to FIG. 4, main differences between a projection apparatus 1C of the fourth embodiment and the projection apparatus 1B of FIG. 3A are as follows. In the projection apparatus 1C, the excitation light source 10C includes a first light-emitting unit 1000 and a second light-emitting unit 1001. Each of the first light-emitting unit 1000 and the second light-emitting unit 1001 may include a plurality of light-emitting elements. The light-emitting elements may include a plurality of laser diodes, a plurality of light-emitting diodes or a combination of the above two light-emitting elements.

The first light-emitting unit 1000 emits a first sub-beam BA. The second light-emitting unit 1001 emits a second sub-beam BB. The multidirectional element 109 is disposed on transmission paths of the first sub-beam BA and the second sub-beam BB. The first sub-beam BA passes through a first part of sub-planes (for example, a plurality of sub-planes in the sub-planes) in the plurality of sub-planes (not shown). The second sub-beam BB passes through a second part of sub-planes (for example, other sub-planes in the sub-planes) in the plurality of sub-planes.

Moreover, the illumination system 10C includes two light diffusing elements, such as a first light diffusing element 112 and a second light diffusing element 113. The first light diffusing element 112 is disposed on a transmission path of the first sub-beam BA coming from the first part of sub-planes and located between the multidirectional element 109 and the light wavelength conversion module 101. In the embodiment, the first light diffusing element 112 is located between the multidirectional element 109 and the lens element 110. The second light diffusing element 113 is disposed on a transmission path of the second sub-beam BB coming from the second part of sub-planes and located between the multidirectional element 109 and the light wavelength conversion module 101. In the embodiment, the second light diffusing element 113 is located between the multidirectional element 109 and the lens element 110. The first light diffusing element 112 and the second light diffusing element 113 have different light diffusing effects. For example, the first light diffusing element 112 and the second light diffusing element 113 may be respectively a diffuser, and a haze of the first light diffusing element 112 is smaller than a haze of the second light diffusing element 113.

The first sub-beam BA forms a plurality of light spots on the light wavelength conversion module 101 after passing through a plurality of sub-planes with larger rotating angles in the multidirectional plane SD, and light uniforming is further performed to the first sub-beam BA via the first light-diffusing element 112 having a lower haze. The second sub-beam BB forms a plurality of light spots on the light wavelength conversion module 101 after passing through a plurality of sub-planes with smaller rotating angles in the multidirectional plane SD, and light uniforming is further performed to the second sub-beam BB via the first light-diffusing element 113 having a higher haze. In this way, a light spot design with a sharp edge, a central energy density of 50% and high edge energy may be obtained.

Figure 5:
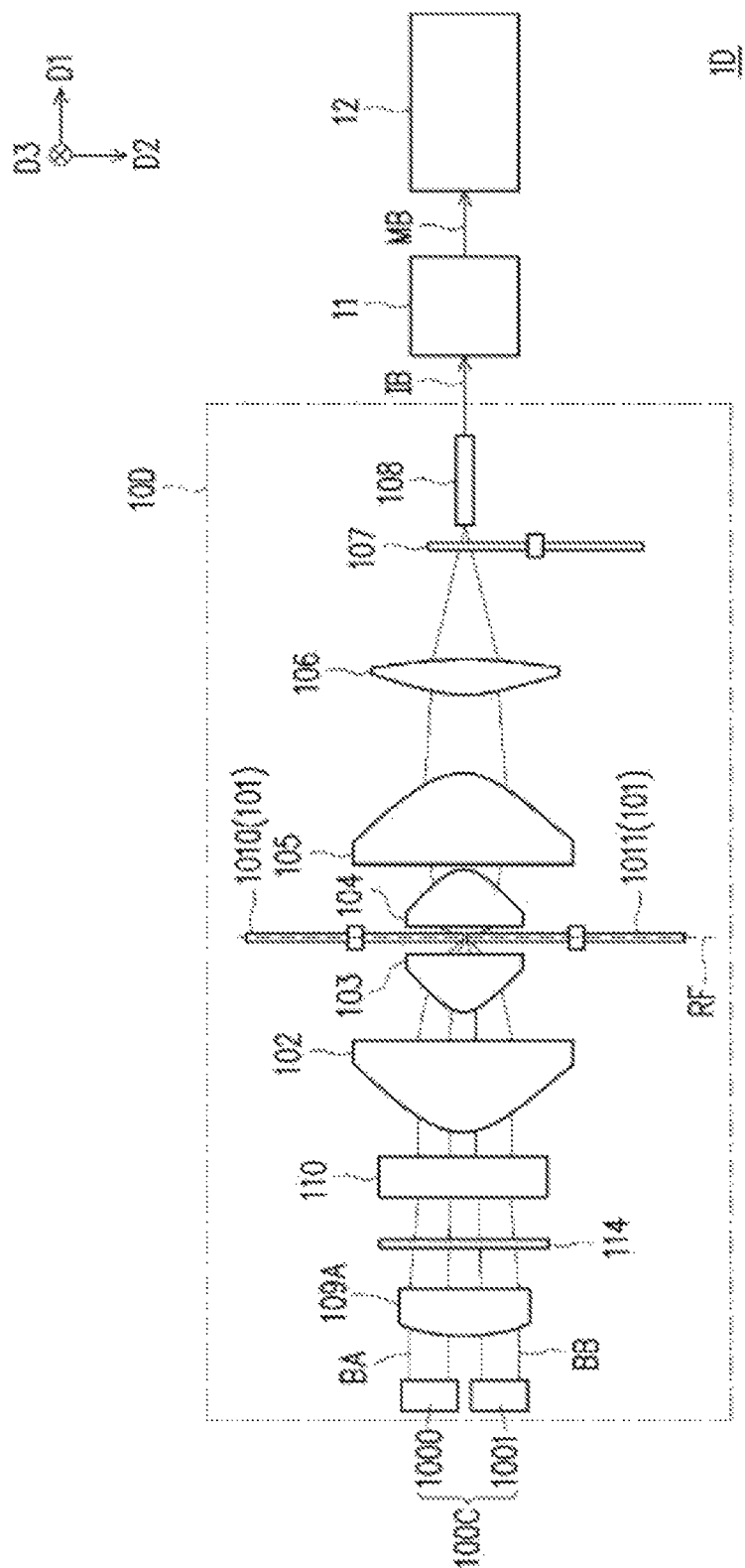

Referring to FIG. 5, main differences between a projection apparatus 1D of the fifth embodiment and the projection apparatus 1A of FIG. 2A are as follows. In the projection apparatus 1D, the illumination system 10D uses a converging lens 109A to replace the multidirectional element 109 of FIG. 2A. Moreover, the illumination system 10D further includes a light spot shaping element 114. The light spot shaping element 114 is disposed on the transmission path of the excitation beam (including the first sub-beam BA and the second sub-beam BB) coming from the excitation light source 100C and located between the excitation light source 100C and the light wavelength conversion module 101 to adjust a shape of the light spot and an energy distribution. For example, the light spot shaping element 114 may be a lens array or a wedge lens. In the embodiment, the light spot shaping element 114 is disposed between the converging lens 109A and the lens element 110. Alternatively, the light spot shaping element 114 may be disposed between the excitation light source 100C and the converging lens 109A or any two components between the lens element 110 and the light wavelength conversion module 101.

Figure 6:
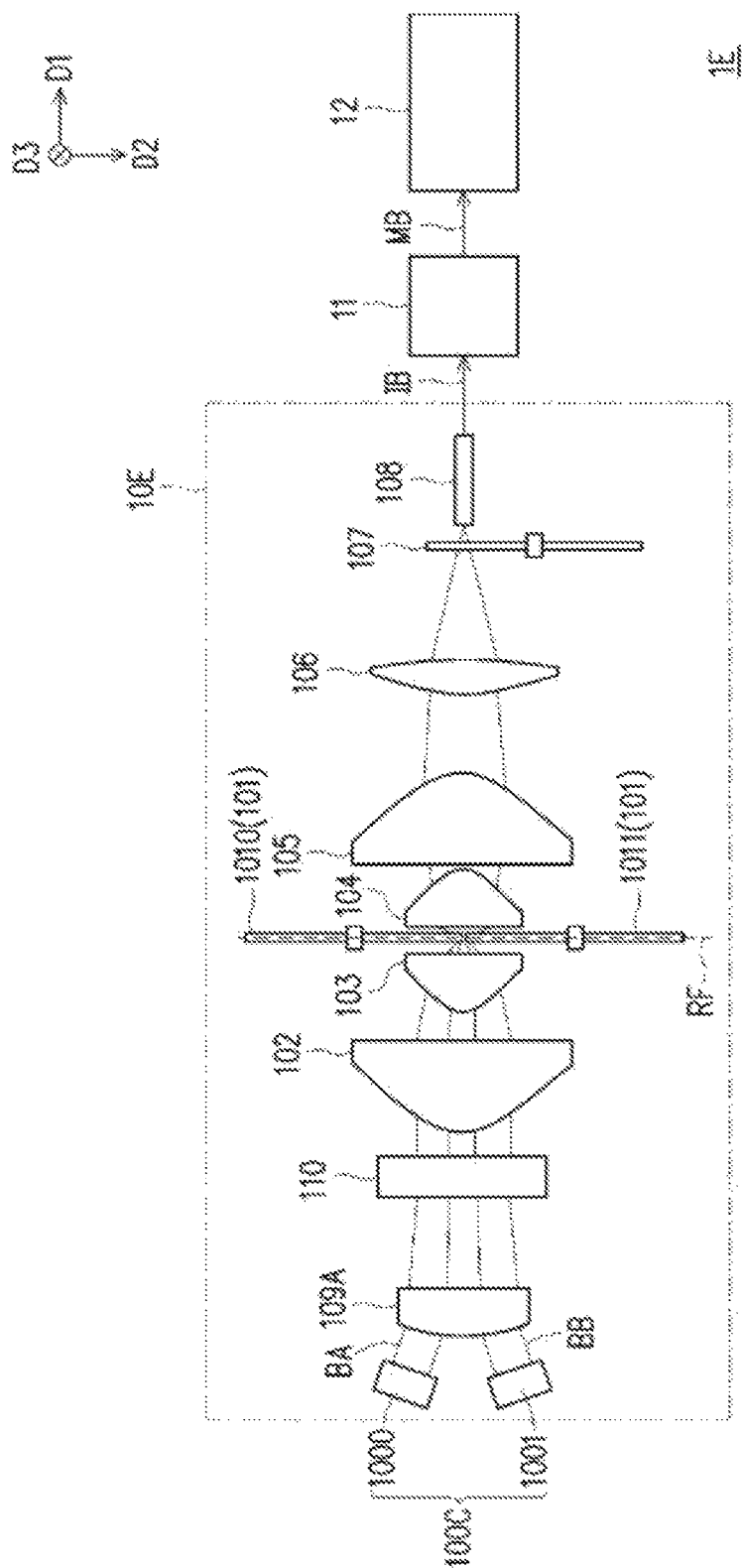

Referring to FIG. 6, main differences between a projection apparatus 1E of the sixth embodiment and the projection apparatus 1D of FIG. 5 are as follows. In the projection apparatus 1E, the illumination system 10E omits the light spot shaping element 114 of FIG. 5. Moreover, the first light-emitting element 1000 is tilt relative to the first phosphor wheel 1010, and the second light-emitting element 1001 is tilt relative to the second phosphor wheel 1011.

In detail, the excitation beam (i.e. the first part of the excitation beam) irradiating the first phosphor wheel 1010 is originated from the first sub-beam BA. Moreover, the excitation beam (i.e. the second part of the excitation beam) irradiating the second phosphor wheel 1011 is originated from the second sub-beam BB. Therefore, by tilting each of the light-emitting units relative to the corresponding phosphor wheel (for example, turning each of the light-emitting units toward an optical axis of the illumination system 10E), the light spots projected on the first phosphor wheel 1010 and the second phosphor wheel 1011 are separated. In this way, the light loss caused by the gap between the two phosphor wheels may be effectively reduced.

Figure 7:
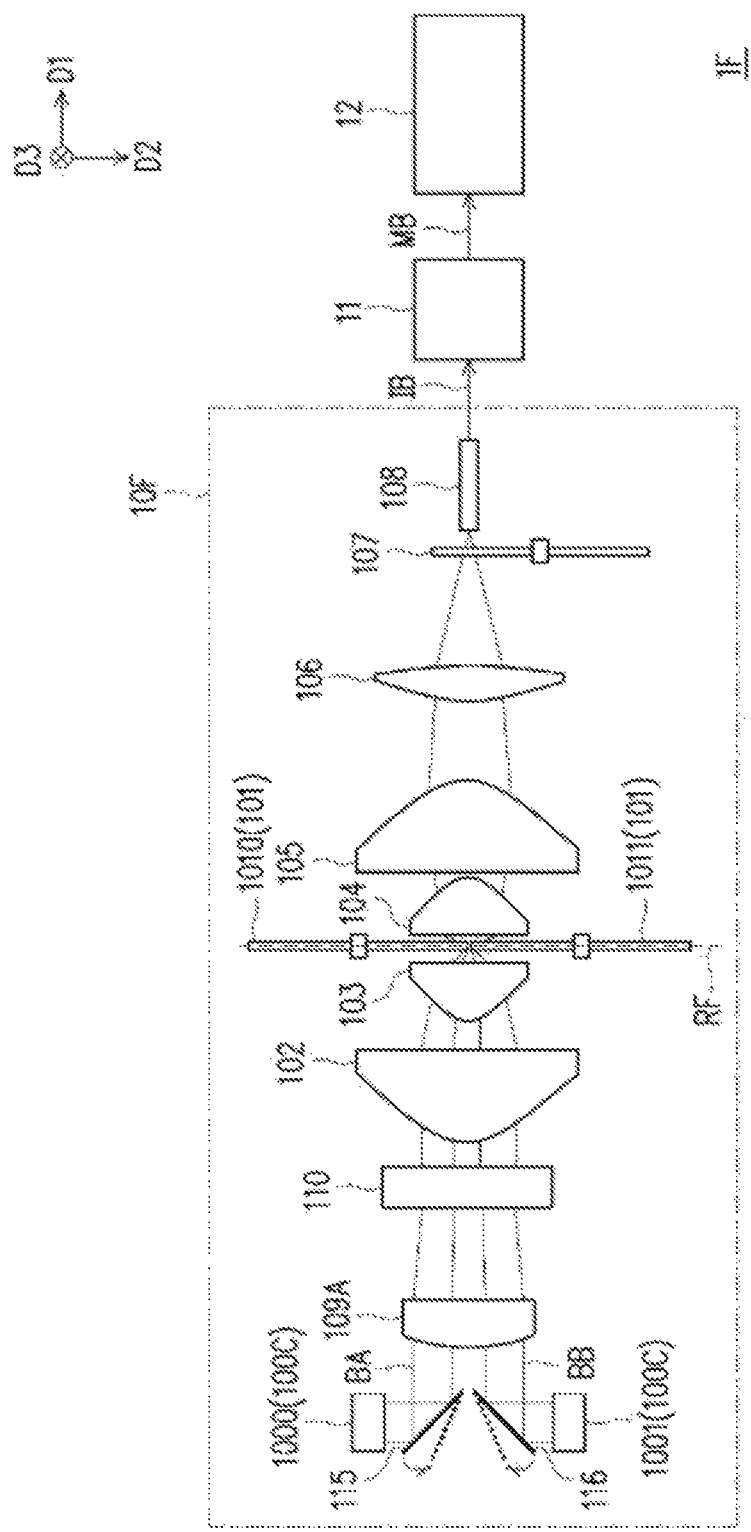

Referring to FIG. 7, main differences between a projection apparatus 1F of the seventh embodiment and the projection apparatus 1E of FIG. 6 are as follows. In the projection apparatus 1E of FIG. 6, the light spots projected on the first phosphor wheel 1010 and the second phosphor wheel 1011 are separated by rotating each of the light-emitting units. In the projection apparatus 1F of FIG. 7, the light spots projected on the first phosphor wheel 1010 and the second phosphor wheel 1011 are separated by rotating reflecting elements.

In detail, the illumination system 10F further includes a first reflecting element 115 and a second reflecting element 116. The first reflecting element 115 is disposed on the transmission path of the first sub-beam BA and located between the first light-emitting unit 1000 and the light wavelength conversion module 101. In the embodiment, the first reflecting element 115 is disposed between the first light-emitting unit 1000 and the converging lens 109A to transmit the first sub-beam BA coming from the first light-emitting unit 1000 to the converging lens 109A. The second reflecting element 116 is disposed on the transmission path of the second sub-beam BB and located between the second light-emitting unit 1001 and the light wavelength conversion module 101. In the embodiment, the second reflecting element 116 is disposed between the second light-emitting unit 1001 and the converging lens 109A to transmit the second sub-beam BB coming from the second light-emitting unit 1001 to the converging lens 109A. The first reflecting element 115 is tilt relative to the first phosphor wheel 1010 (for example, the first reflecting element 115 is rotated toward the optical axis of the illumination system 10F by an angle greater than 0 degrees and smaller than 45 degrees), and the second reflecting element 116 is tilt relative to the second phosphor wheel 1011 (for example, the second reflecting element 116 is rotated toward the optical axis of the illumination system 10F by an angle greater than 0 degrees and smaller than 45 degrees), such that the plurality of light spots projected on the first phosphor wheel 1010 and the second phosphor wheel 1011 are separated from each other.

Figure 8A:
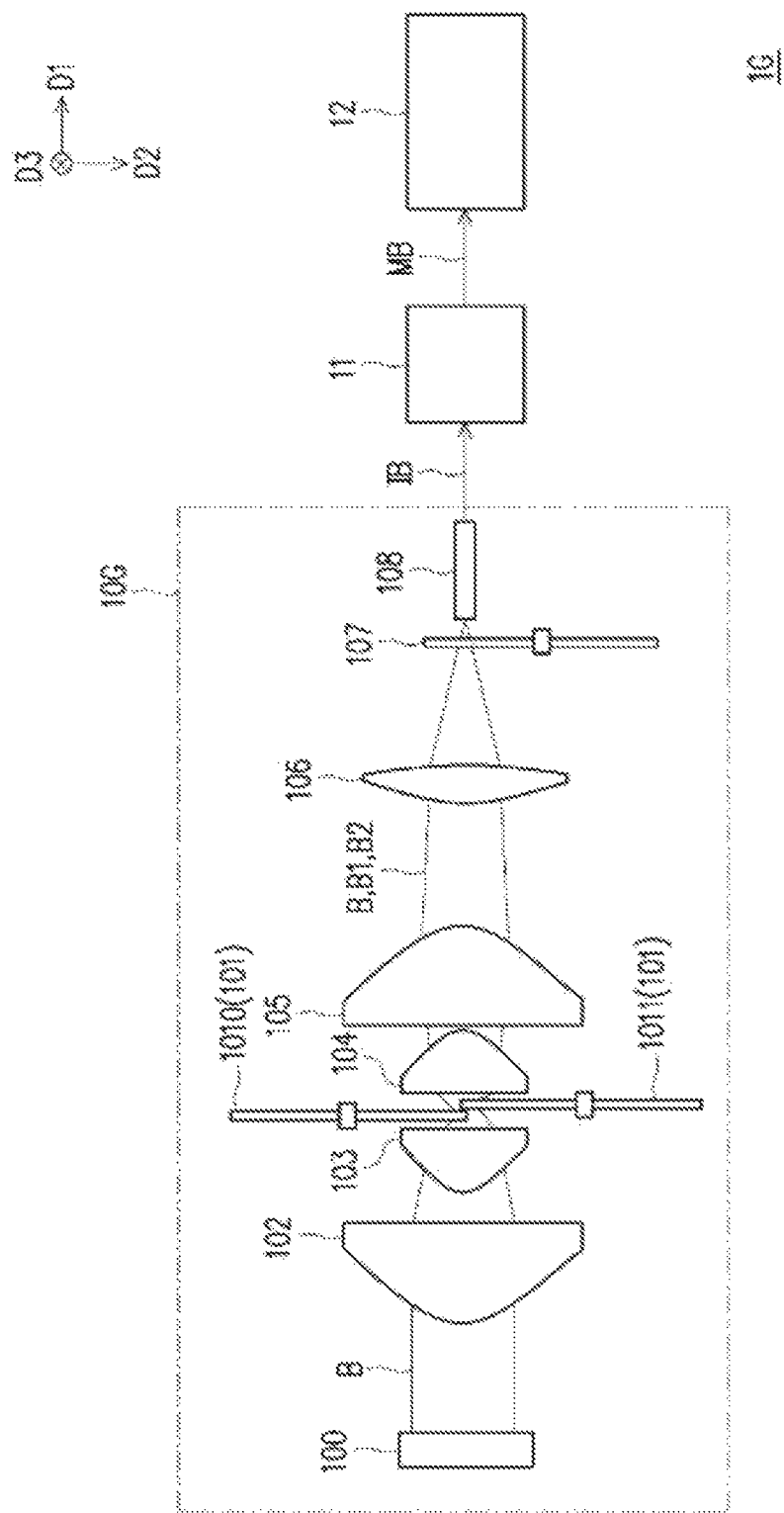
FIG. 8A is a schematic diagram of a projection apparatus according to an eighth embodiment of the invention.
Figure 8B:
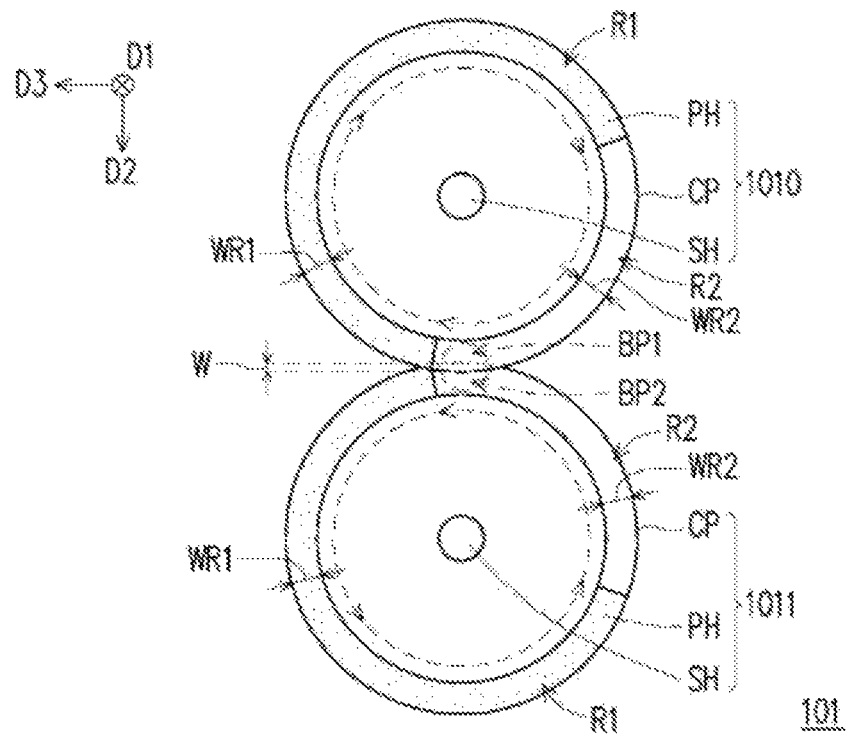
FIG. 8B is a front view of a first phosphor wheel and a second phosphor wheel of FIG. 8A.

FIG. 8A is a schematic diagram of a projection apparatus according to an eighth embodiment of the invention. FIG. 8B is a front view of a first phosphor wheel and a second phosphor wheel of FIG. 8A. Referring to FIG. 8A and FIG. 8B, main differences between a projection apparatus 1G of the eighth embodiment and the projection apparatus 1 of FIG. 1A are as follows. In the projection apparatus 1G, the first phosphor wheel 1010 and the second phosphor wheel 1011 are partially overlapped, and an overlapped width W of the first phosphor wheel 1010 and the second phosphor wheel 1011 in a radial direction is smaller than a radial width WR1 of the light conversion region R1 of the first phosphor wheel 1010 and a radial width WR1 of the light conversion region R1 of the second phosphor wheel 1011, such that the light conversion region R1 of the first phosphor wheel 1010 and the light conversion region R1 of the second phosphor wheel 1011 are both irradiated by the excitation beam B. On the other hand, the overlapped width W of the first phosphor wheel 1010 and the second phosphor wheel 1011 in the radial direction is smaller than a radial width WR2 of the non-light conversion region R2 of the first phosphor wheel 1010 and a radial width WR2 of the non-light conversion region R2 of the second phosphor wheel 1011, such that the non-light conversion region R2 of the first phosphor wheel 1010 and the non-light conversion region R2 of the second phosphor wheel 1011 are both irradiated by the excitation beam B.

Based on the above design, the light loss caused by the gap between the two phosphor wheels may be reduced. Besides, a problem of phosphor conversion efficiency reduction and phosphor powder burning due to that the high energy beam only irradiates a single phosphor wheel, etc., may also be avoided.

In the embodiment, the first phosphor wheel 1010 is closer to the excitation light source 100 than the second phosphor wheel 1011. Namely, the two phosphor wheels are not configured on the same reference plane (for example, the reference plane RF shown in FIG. 1A). Under such framework, a path length and a time of transmitting the first part BP1 from the excitation light source 100 to the first phosphor wheel 1010 are smaller than a path length and a time of transmitting the second part BP2 from the excitation light source 100 to the second phosphor wheel 1011. However, since a difference between the two path lengths is far smaller than a length that light travels per second, the first part BP1 and the second part BP2 are almost simultaneously transmitted to the light wavelength conversion module 101. In another embodiment, the second phosphor wheel 1011 may be closer to the excitation light source 100 than the first phosphor wheel 1010.

Figure 9A:
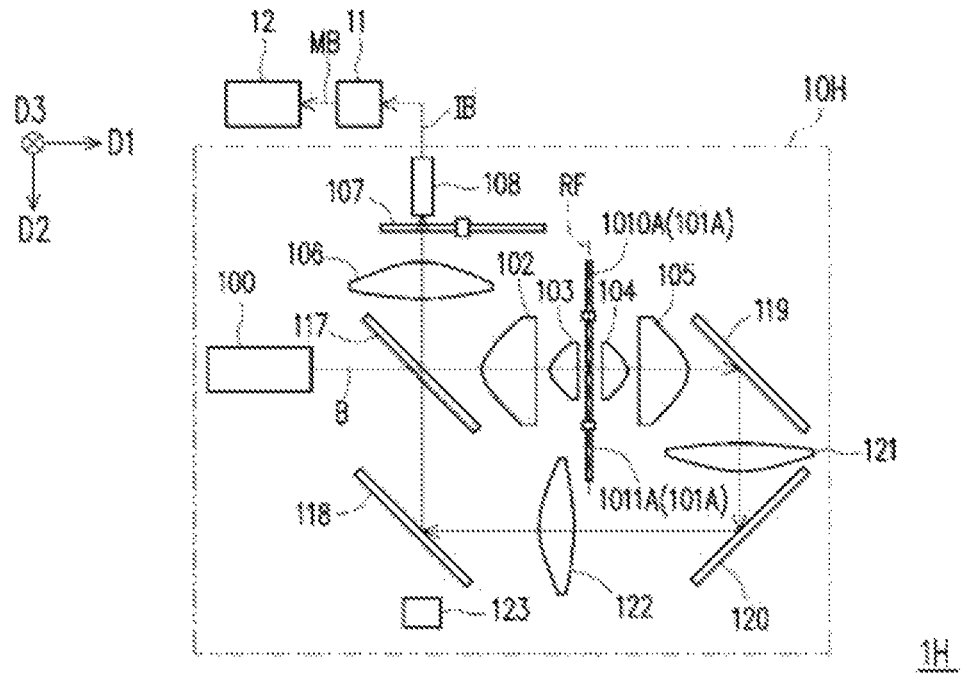
FIG. 9A to FIG. 9C are schematic diagrams of a projection apparatus in a first time interval to a third time interval according to a ninth embodiment of the invention.
Figure 9B:
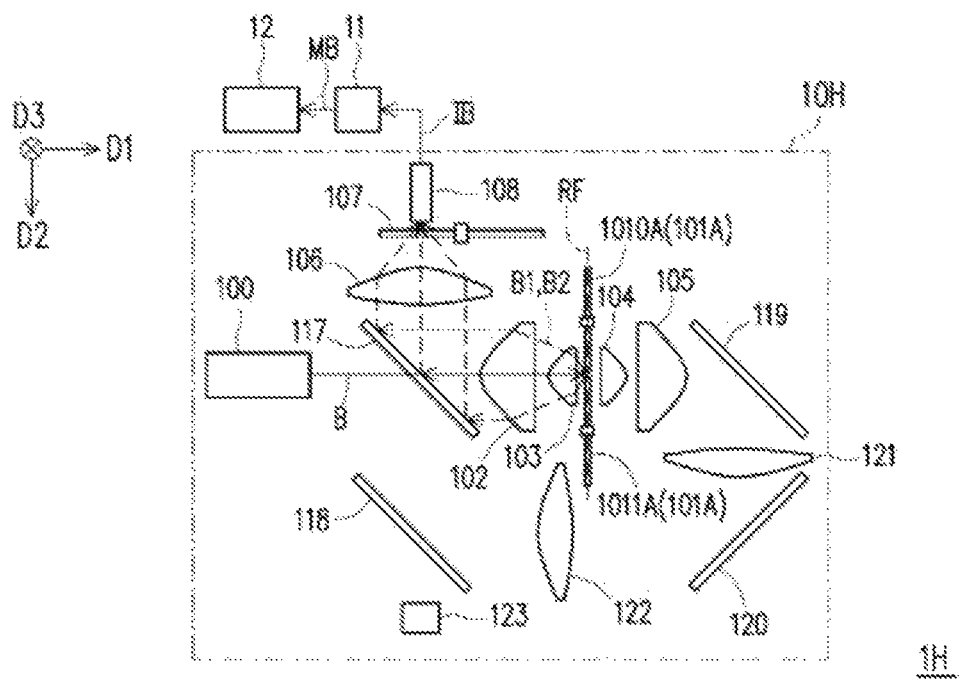
Figure 9C:
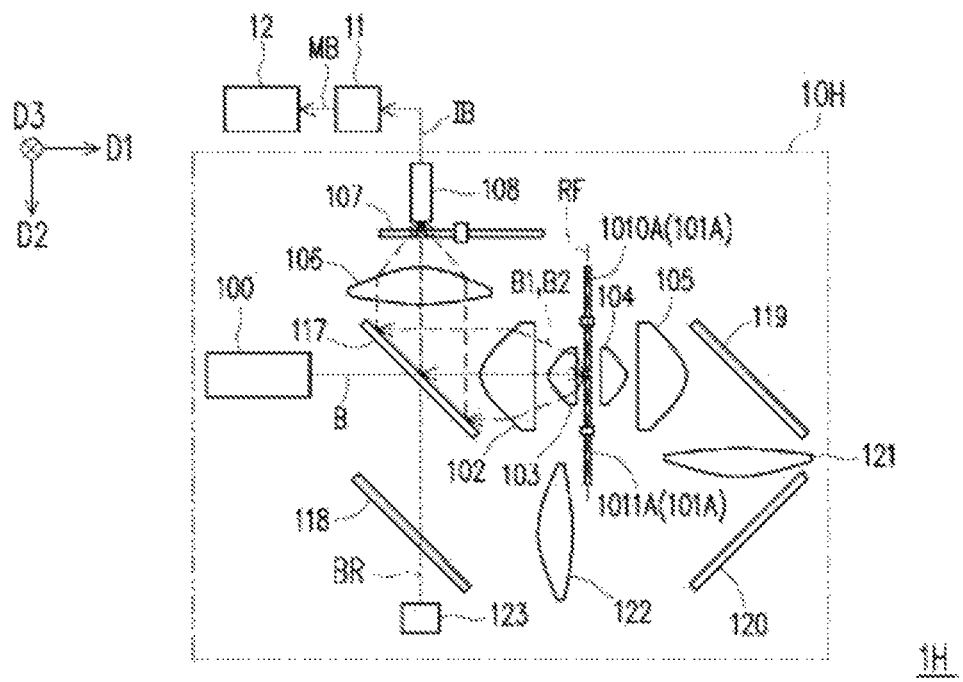

FIG. 9A to FIG. 9C are schematic diagrams of the projection apparatus in the first time interval to the third time interval according to a ninth embodiment of the invention. Referring to FIG. 9A to FIG. 9C, main differences between a projection apparatus 1H of the ninth embodiment and the projection apparatus 1 of FIG. 1A are as follows. In the projection apparatus 1H, the first phosphor wheel 1010A and the second phosphor wheel 1011A of the light wavelength conversion module 101A are all reflective phosphor wheels. In detail, the carrier plate of the first phosphor wheel 1010A and the carrier plate of the second phosphor wheel 1011A are all metal carrier plates or transparent carrier plates with reflection layer(s) formed thereon. The light conversion region of each of the phosphor wheels (for example, the first phosphor wheel 1010A and the second phosphor wheel 1011A) is a reflection region adapted to reflect light, and the non-light conversion region of each of the phosphor wheels is a light penetration region that allows the excitation beam to pass through. When the carrier plate is the metal carrier plate, the non-light conversion region may be formed with a hollow opening to allow the excitation beam to pass through. When the carrier plate is the transparent carrier plate with the reflection layer(s) formed thereon, the reflection layer exposes the non-light conversion region to allow the excitation beam to pass through.

The illumination system 10H may further include a dichroic element 117, a dichroic element 118, a plurality of reflecting elements (for example, a reflecting element 119 and a reflecting element 120), a plurality of lens elements (for example, a lens element 121 and a lens element 122) and an auxiliary light source (for example, a red light source 123).

The dichroic element 117 is disposed on the transmission path of the excitation beam B coming from the excitation light source 100 and a transmission path of a red beam BR coming from the red light source 123. In the embodiment, the dichroic element 117 allow the excitation beam B (for example, the blue beam) and the red beam BR (for example, the red beam with a wavelength greater than or equal to 638 nm) to pass through and reflects the other colors of light beams (for example, the green beam, the yellow beam and the orange beam, etc.). Alternatively, the dichroic element 117 may reflect the excitation beam B and the red beam BR and allow other colors of light beams to pass through.

The plurality of reflecting elements are sequentially disposed on the transmission path of the excitation beam B passing through the non-light conversion region of the phosphor wheel, and the dichroic element 118 is disposed on the transmission path of the excitation beam B coming from the reflecting element (for example, the reflecting element 120). The dichroic element 118 is adapted to reflect the excitation beam B to transmit the excitation beam B passing through the non-light conversion region of the phosphor wheel back to the dichroic element 117. The dichroic element 118 is further disposed on the transmission path of the red beam BR coming from the red light source 123, and the dichroic element 118 is adapted to allow the red beam BR coming from the red light source 123 to pass through.

The plurality of lens elements may be disposed between two adjacent reflecting elements, between the reflecting element 120 and the dichroic element 118 and/or between the dichroic element 117 and the dichroic element 118, so as to converge light beam.

Referring to FIG. 9A, within the first time interval, the excitation light source 100 is turned on, and the red light source 123 is turned off. The non-light conversion region of each of the phosphor wheels is cut into the transmission path of the excitation beam B, and the light penetration region of the filter module 107 is cut into the transmission path of the light beam coming from the lens element 106. The excitation beam B coming from the excitation light source 100 is transmitted to the light uniforming element 108 through a loop shown in FIG. 9A (referring to fine solid lines in the illumination system 10H), and is then output from the illumination system 10H. In other words, the light beam output from the illumination system 10H is the blue beam within the first time interval.

Referring to FIG. 9B, within the second time interval, the excitation light source 100 is turned on, and the red light source 123 is turned off. The light conversion region of each of the phosphor wheels is cut into the transmission path of the excitation beam B, and the green filter region of the filter module 107 is cut into the transmission path of the light beam coming from the lens element 106. The excitation beam B coming from the excitation light source 100 sequentially passes through the dichroic element 117, the lens element 102, and the lens element 103, and is transmitted to the light conversion region of each of the phosphor wheels. A first part (the part of the excitation beam B irradiating the first phosphor wheel 1010A) and a second part (the part of the excitation beam B irradiating the second phosphor wheel 1011A) of the excitation beam B are respectively converted into the first converted beam B1 and the second converted beam B2 by the light conversion region of the first phosphor wheel 1010A and the light conversion region of the second phosphor wheel 1011A. In the embodiment, the first converted beam B1 and the second converted beam B2 are all yellow beams. The first converted beam B1 and the second converted beam B2 (which are all referred to as converted beams hereinafter) are respectively reflected by the light conversion region of the first phosphor wheel 1010A and the light conversion region of the second phosphor wheel 1011A, and the reflected converted beams sequentially pass through the lens element 103 and the lens element 102, and are transmitted to the dichroic element 117. The color beams in the converted beams such as the green beam, the yellow beam and the orange beam, etc., are reflected by the dichroic element 117, and are transmitted to the green filter region of the filter module 107 through the lens element 106. The green filter region allows a green part of the color beams transmitted to the filter module 107, and the green part passing through the green filter region then passes through the light uniforming element 108, and is then output from the illumination system 10H. In other words, the light beam output from the illumination system 10H is the green beam within the second time interval.

Referring to FIG. 9C, within the third time interval, the excitation light source 100 is turned on, and the red light source 123 is turned on. The light conversion region of each of the phosphor wheels is cut into the transmission path of the excitation beam B, and the red filter region of the filter module 107 is cut into the transmission path of the light beam coming from the lens element 106. The paths of the excitation beam B and the converted beams may refer to related description of FIG. 9B, and details thereof are not repeated. A main difference between FIG. 9B and FIG. 9C is that the red filter region allow a red part of the color beams transmitted to the filter module 107 to pass through, and the red part passing through the red filter region then passes through the light uniforming element 108, and is then output from the illumination system 10H.

Moreover, the red beam BR coming from the red light source 123 sequentially passes through the dichroic element 118, the dichroic element 117 and the lens element 106 and is transmitted to the red filter region of the filter module 107. At least a part of the red beam BR passes through the red filter region of the filter module 107, and the red beam BR passing through the red filter region then passes through the light uniforming element 108, and is then output from the illumination system 10. In other words, the light beam output from the illumination system 10H is the red beam within the third time interval. The red beam includes a red beam BR coming from the red light source 123 (for example, with a wavelength greater than or equal to 638 nm) and the red part in the converted beams (for example, the red beam with a wavelength smaller than 638 nm).

According to different requirements, the illumination system 10H may further include other components or omits a part of the components. For example, the filter module 107 may be omitted, and the phosphor layer used for producing the yellow beam in each of the phosphor wheels is replaced by the phosphor layer used for producing the green beam and the phosphor layer used for producing the red beam. Under such framework, within the first time interval, the excitation light source 100 is turned on, and the red light source 123 is turned off, and the non-light conversion region of each of the phosphor wheels is cut into the transmission path of the excitation beam B. Within the second time interval, the excitation light source 100 is turned on, and the red light source 123 is turned off, and the green light conversion region of each of the phosphor wheels is cut into the transmission path of the excitation beam B. Within the third time interval, the excitation light source 100 is turned on, and the red light source 123 is turned on, and the red light conversion region of each of the phosphor wheels is cut into the transmission path of the excitation beam B. Alternatively, the filter module 107 may be omitted, and the phosphor layer used for producing the yellow beam in each of the phosphor wheels is replaced by the phosphor layer used for producing the green beam. Under such framework, the excitation light source 100 and the red light source 123 are turned on in time-division. To be specific, within the first time interval, the excitation light source 100 is turned on, the red light source 123 is turned off, and the non-light conversion region of each of the phosphor wheels is cut into the transmission path of the excitation beam B. Within the second time interval, the excitation light source 100 is turned on, the red light source 123 is turned off, and the green light conversion region of each of the phosphor wheels is cut into the transmission path of the excitation beam B. Within the third time interval, the excitation light source 100 is turned off, and the red light source 123 is turned on.

Moreover, relative configuration relationships between the plurality of components of the illumination system 10H may be changed according to an actual requirement, though the invention is not limited thereto. For example, the first phosphor wheel 1010A and the second phosphor wheel 1011A may be partially overlapped in the radial direction (shown in FIG. 8A and FIG. 8B). The above amelioration may be applied to the following embodiments, and detail thereof is not repeated.

Figure 10A:
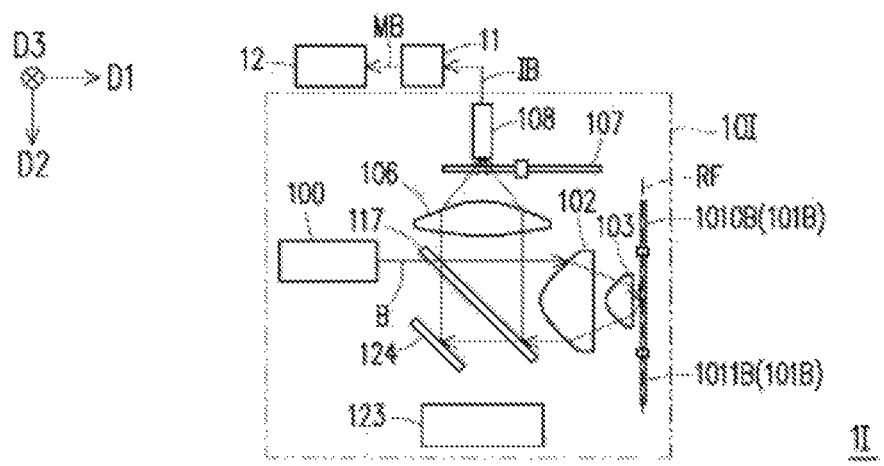
FIG. 10A to FIG. 10C are schematic diagrams of the projection apparatus in the first time interval to the third time interval according to a tenth embodiment of the invention.
Figure 10B:
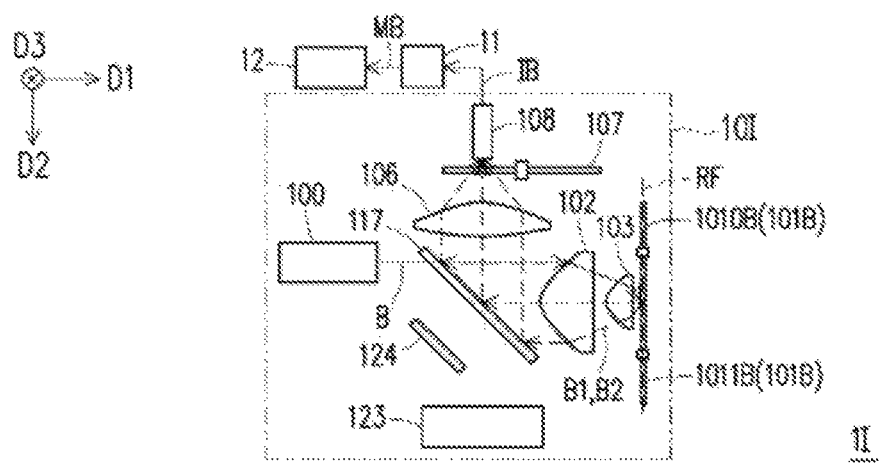
Figure 10C:
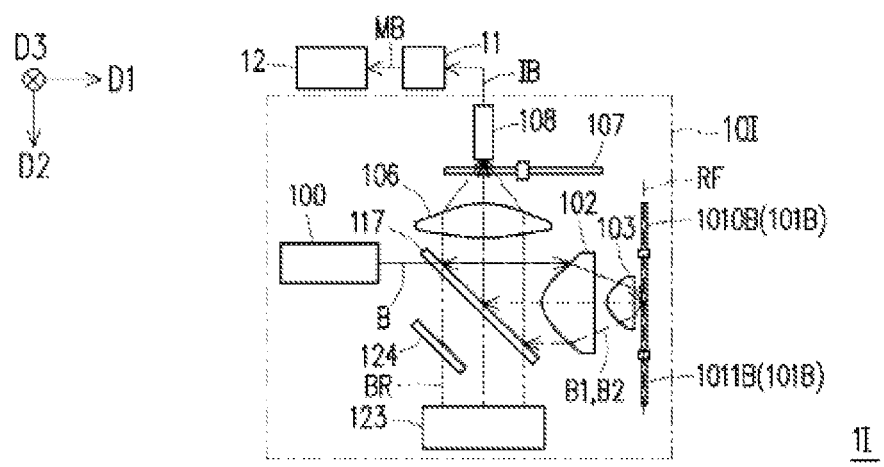

FIG. 10A to FIG. 10C are schematic diagrams of the projection apparatus in the first time interval to the third time interval according to a tenth embodiment of the invention. Referring to FIG. 10A to FIG. 10C, main differences between a projection apparatus 1I of the tenth embodiment of the invention and the projection apparatus 1H of FIG. 9A to FIG. 9C are as follows. In the projection apparatus 1I, the non-light conversion region of each of the phosphor wheels (including the first phosphor wheel 1010B and the second phosphor wheel 1011B) in the light wavelength conversion module 101B is a reflection region. Namely, the excitation beam B transmitted to the non-light conversion region is reflected by the non-light conversion region.

Moreover, the illumination system 10I omits the optical elements (for example, the lens element 104, the lens element 105, the reflecting element 119, the lens element 121, the reflecting element 120, the lens element 122 and the dichroic element 118) used for transmitting the excitation beam B passing through the light wavelength conversion module 101B back to the dichroic element 117 in FIG. 9A to FIG. 9C.

Furthermore, the illumination system 10I further includes a dichroic element 124. The dichroic element 124 is disposed on the transmission path of the excitation beam B sequentially passing through the lens element 103, the lens element 102 and the diachronic element 117 and the transmission path of the red beam BR coming from the red light source 123. In the embodiment, the diachronic element 124 is adapted to reflect the excitation beam B and allows the red beam BR to pass through.

Referring to FIG. 10A, within the first time interval, the excitation light source 100 is turned on, and the red light source 123 is turned off. The non-light conversion region of each of the phosphor wheels is cut into the transmission path of the excitation beam B, and the light penetration region of the filter module 107 is cut into the transmission path of the light beam coming from the lens element 106. The excitation beam B coming from the excitation light source 100 is transmitted to the light uniforming element 108 through a loop shown in FIG. 10A (referring to fine solid lines in the illumination system 10I), and is then output from the illumination system 10I. In other words, the light beam output from the illumination system 10I is the blue beam within the first time interval. It should be noted that, in FIG. 10A, the excitation beam B transmitted from the excitation light source 100 to the light wavelength conversion module 101B is reflected by the non-light conversion region of each of the phosphor wheels and is transmitted back to the dichroic element 117, wherein the excitation beam B transmitted from the excitation light source 100 toward the light wavelength conversion module 101B and the excitation beam B transmitted back to the dichroic element 117 from the light wavelength conversion module 101B respectively pass through two opposite end portions of the dichroic element 117.

Referring to FIG. 10B, within the second time interval, the excitation light source 100 is turned on, and the red light source 123 is turned off. The light conversion region of each of the phosphor wheels is cut into the transmission path of the excitation beam B, and the green filter region of the filter module 107 is cut into the transmission path of the light beam coming from the lens element 106. The excitation beam B coming from the excitation light source 100 sequentially passes through the dichroic element 117, the lens element 102 and the lens element 103, and is transmitted to the light conversion region of each of the phosphor wheels. The first part of the excitation beam B (the part of the excitation beam B irradiating the first phosphor wheel 1010B) and the second part of the excitation beam B (the part of the excitation beam B irradiating the second phosphor wheel 1011B) are respectively converted into the first converted beam B1 and the second converted beam B2 by the light conversion region of the first phosphor wheel 1010B and the light conversion region of the second phosphor wheel 1011B. In the embodiment, the first converted beam B1 and the second converted beam B2 are all yellow beams. The first converted beam B1 and the second converted beam B2 (which are all referred to as converted beams hereinafter) are respectively reflected by the light conversion region of the first phosphor wheel 1010B and the light conversion region of the second phosphor wheel 1011B, and the reflected converted beams sequentially pass through the lens element 103 and the lens element 102, and are transmitted to the dichroic element 117. The color beams in the converted beams such as the green beam, the yellow beam and the orange beam, etc., are reflected by the dichroic element 117, and are transmitted to the green filter region of the filter module 107 through the lens element 106. The green filter region allows a green part of the color beams transmitted to the filter module 107 to pass through, and the green part passing through the green filter region then passes through the light uniforming element 108, and is then output from the illumination system 10I. In other words, the light beam output from the illumination system 10H is the green beam within the second time interval.

Referring to FIG. 10C, within the third time interval, the excitation light source 100 is turned on, and the red light source 123 is turned on. The light conversion region of each of the phosphor wheels is cut into the transmission path of the excitation beam B, and the red filter region of the filter module 107 is cut into the transmission path of the light beam coming from the lens element 106. The paths of the excitation beam B and the converted beams may refer related description of FIG. 10B, and details thereof are not repeated. A main difference between FIG. 10B and FIG. 10C is that the red filter region allows a red part of the color beams transmitted to the filter module 107 to pass through, and the red part passing through the red filter region then passes through the light uniforming element 108, and is then output from the illumination system 10I.

Moreover, a part of the red beam BR coming from the red light source 123 sequentially passes through the dichroic element 124, the dichroic element 117 and the lens element 106 and is transmitted to the red filter region of the filter module 107, and another part of the red beam BR coming from the red light source 123 sequentially passes through the dichroic element 117 and the lens element 106 and is transmitted to the red filter region of the filter module 107. In other words, the dichroic element 124 is only disposed on the transmission path of a part of the red beam BR, rather than the transmission path of the entire red beam BR. At least a part of the red beam BR passes through the red filter region of the filter module 107, and the red beam BR passing through the red filter region then passes through the light uniforming element 108, and is then output from the illumination system 10I. In other words, the light beam output from the illumination system 10I is the red beam within the third time interval. The red beam includes a red beam BR coming from the red light source 123 (for example, with a wavelength greater than or equal to 638 nm) and the red part in the converted beams (for example, the red beam with a wavelength smaller than 638 nm).

According to different requirements, the illumination system 10I may further include other components or omits a part of the components, for example, omits the filter module 107 as described above. Related description thereof may refer to corresponding description of FIG. 9C, and detail thereof is not repeated.

Figure 11A:
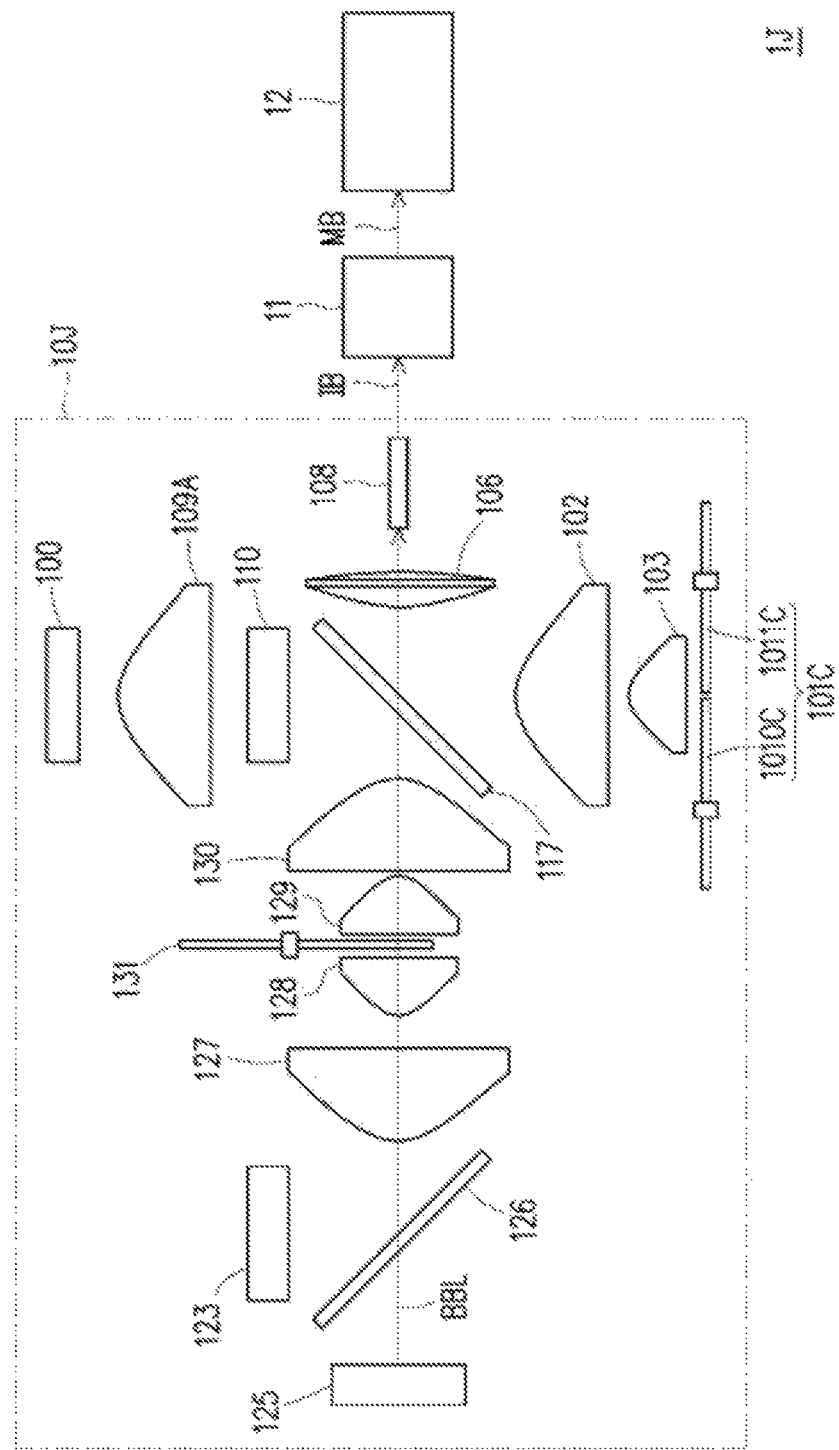
FIG. 11A to FIG. 11C respectively illustrate transmission paths of a blue beam, a green beam and a red beam in a projection apparatus according to an eleventh embodiment of the invention.
Figure 11B:
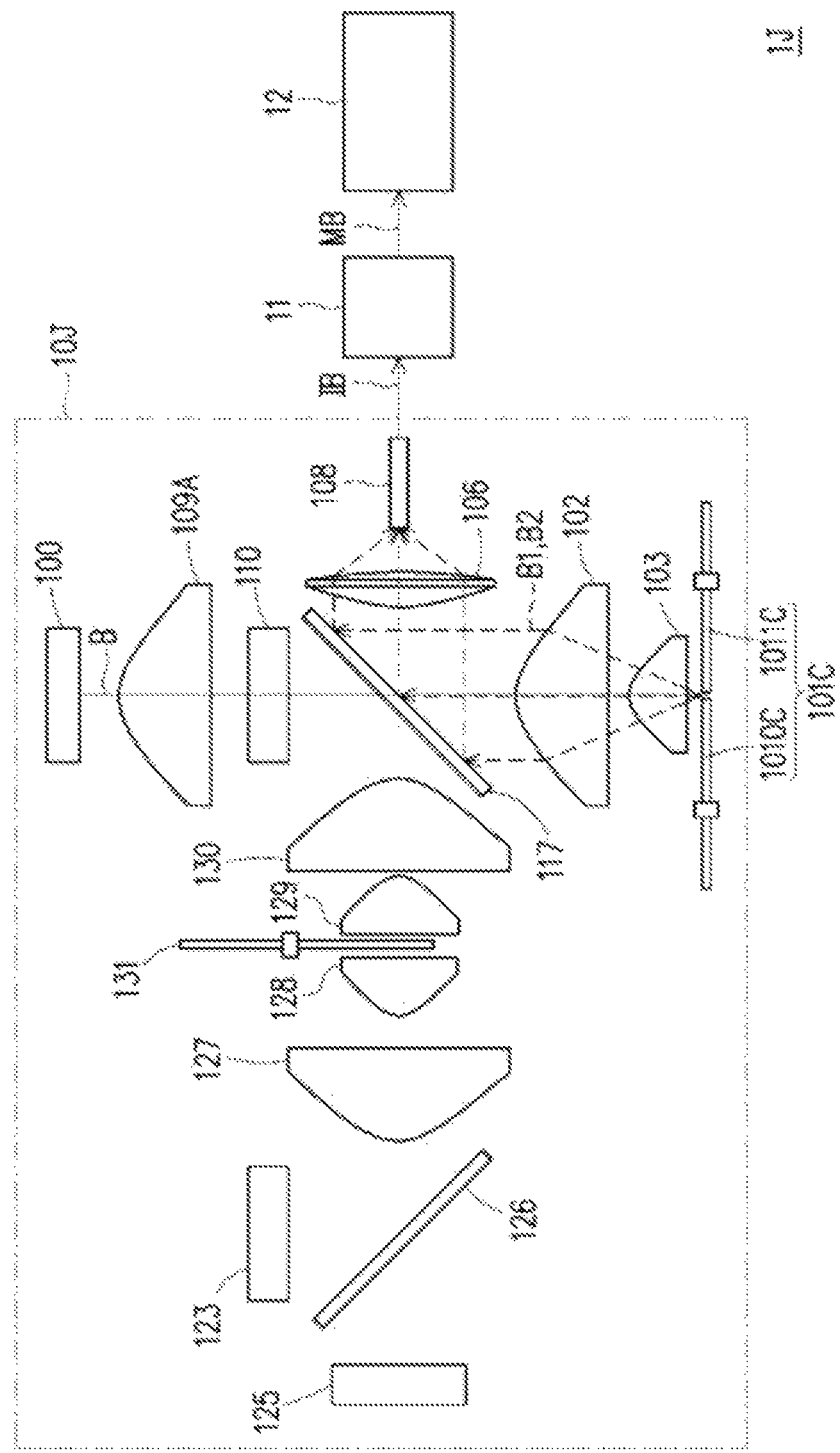
Figure 11C:
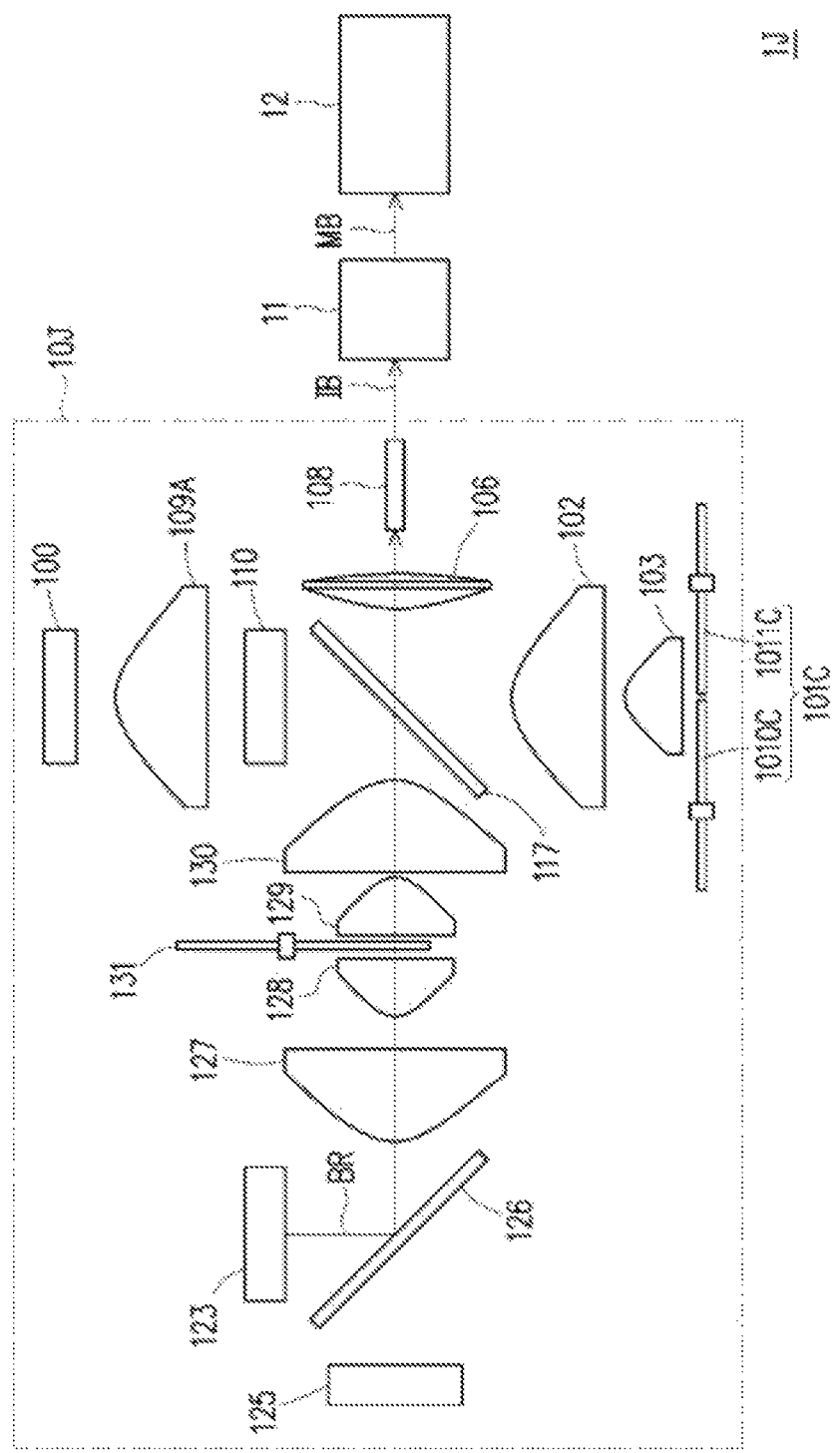

FIG. 11A to FIG. 11C respectively illustrate transmission paths of a blue beam, a green beam and a red beam in the projection apparatus according to an eleventh embodiment of the invention. Referring to FIG. 11A to FIG. 11C, main differences between a projection apparatus 1J of the eleventh embodiment of the invention and the projection apparatus 1I of FIG. 10A to FIG. 10C are as follows.

In the projection apparatus 1J, the illumination system 10J omits the dichroic element 124 and the filter module 107 in FIG. 10A to FIG. 10C.

Moreover, each of the phosphor wheels (for example, the first phosphor wheel 1010C and the second phosphor wheel 1011C) of the light wavelength conversion module 101C includes the light conversion region (for example, the light conversion region R1 of FIG. 1B), but does not include the non-light conversion region (for example, the non-light conversion region R2 in FIG. 1B). Under such framework, the shape of the light conversion region may be a ring arranged around the rotation shaft.

Furthermore, the illumination system 10J further includes the converging lens 109A and the lens element 110 of FIG. 5. Related descriptions of the converging lens 109A and the lens element 110 may refer to the aforementioned description, and details thereof are not repeated.

In addition, the illumination system 10J further includes a blue light source 125, a dichroic element 126, a plurality of lens elements (for example, a lens element 127, a lens element 128, a lens element 129 and a lens element 130) and a light diffusing element 131.

The blue light source 125 is adapted to provide a blue beam BBL. For example, the blue light source 125 includes a plurality of light-emitting elements. The plurality of light-emitting elements may include a plurality of laser diodes, a plurality of light-emitting diodes or a combination thereof.

The dichroic element 126 is disposed on a transmission path of the blue beam BBL coming from the blue light source 125 and a transmission path of the red beam BR coming from the red light source 123. In the embodiment, the dichroic element 126 is adapted to allow the blue beam BBL to pass through and reflect the red beam BR. In another embodiment, positions of the blue light source 125 and the red light source 123 may be exchanged, and the dichroic element 126 may allow the red beam BR to pass through and reflects the blue beam BBL.

The lens element 127, the lens element 128, the light diffusing element 131, the lens element 129 and the lens element 130 are sequentially disposed between the dichroic element 126 and the dichroic element 117. The lens elements are, for example, adapted to converge light, and the light diffusing element 131 is adapted to diffuse the light spot. For example, the light diffusing element 131 may be a diffuser, though the invention is not limited thereto. The light diffusing element 131 may have a rotation function, though the invention is not limited thereto.

Referring to FIG. 11A, when the blue light source 125 is turned on, the blue beam BBL coming from the blue light source 125 is transmitted to the light uniforming element 108 through a path shown in FIG. 11A (referring to a fine solid line in the illumination system 10J), and is then output from the illumination system 10J.

Referring to FIG. 11B, when the excitation light source 100 is turned on, the excitation beam B coming from the excitation light source 100 sequentially passes through the converging lens 109A, the lens element 110, the diachronic element 117, the lens element 102 and the lens element 103, and is transmitted to the light conversion region of each of the phosphor wheels (for example, the first phosphor wheel 1010C and the second phosphor wheel 1011C). The first part of the excitation beam B is converted into the first converted beam B1 (for example, the yellow beam) after passing through the light conversion region of the first phosphor wheel 1010C. The first converted beam B1 is reflected by the light conversion region to sequentially pass through the lens element 103 and the lens element 102 and is transmitted back to the dichroic element 117. The green beam in the first converted beam B1 is reflected by the dichroic element 117, and the red beam in the first converted beam B1 passes through the dichroic element 117 (not shown). The reflected green beam sequentially passes through the lens element 106 and the light uniforming element 108, and is then output from the illumination system 10J. Moreover, the second part of the excitation beam B is converted into the second converted beam B2 (for example, the yellow beam) after passing through the light conversion region of the second phosphor wheel 1011C. The second converted beam B2 is reflected by the light conversion region to sequentially pass through the lens element 103 and the lens element 102 and is transmitted back to the dichroic element 117. The green beam in the second converted beam B2 is reflected by the dichroic element 117, and the red beam in the second converted beam B2 passes through the dichroic element 117 (not shown). The reflected green beam sequentially passes through the lens element 106 and the light uniforming element 108, and is then output from the illumination system 10J.

Referring to FIG. 11C, when the red light source 123 is turned on, the red beam BR coming from the red light source 123 is transmitted to the light uniforming element 108 through the path shown in FIG. 11C (referring to the fine solid lines in the illumination system 10J), and is then output from the illumination system 10J.

Figure 12A:
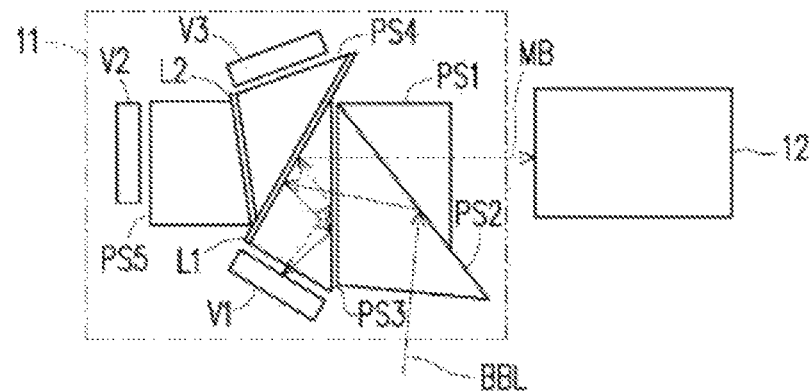
FIG. 12A to FIG. 12C are enlarged views of a display device and a projection lens applied to the eleventh embodiment of the invention, which respectively illustrate transmission paths of a blue beam, a green beam and a red beam.
Figure 12B:
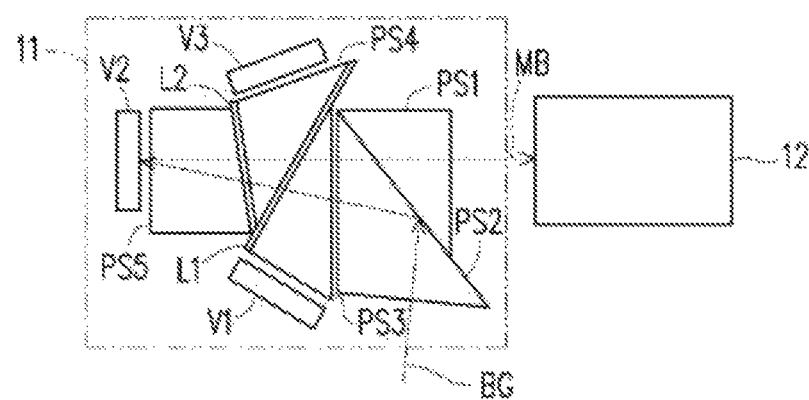
Figure 12C:
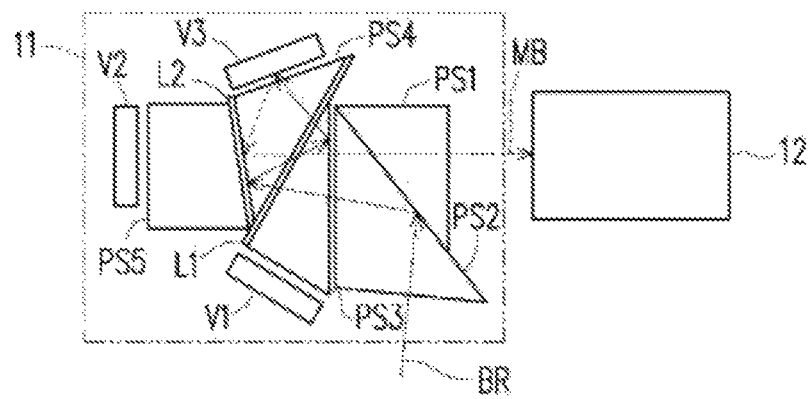

FIG. 12A to FIG. 12C are enlarged views of a display device and a projection lens applied to the eleventh embodiment of the invention, which respectively illustrate transmission paths of the blue beam, the green beam and the red beam. Referring to FIG. 12A to FIG. 12C, the display device 11 may include a plurality of light valves (for example, a light valve V1, a light valve V2 and a light valve V3), a plurality of prisms (for example, a prism PS1, a prism PS2, a prism PS3, a prism PS4 and a prism PS5) and a plurality of optical layers (for example, an optical layer L1 and an optical layer L2).

The light valve V1, the light valve V2 and the light valve V3 are respectively used for converting the blue beam, the green beam and the red beam into an image beam MB. For example, each of the light valves may be a liquid crystal display (LCD) panel, a liquid crystal on silicon (LCOS)

panel or a digital micro-mirror device (DMD), though the invention is not limited thereto.

The prisms and the optical layers are used for guiding different color beams to different light valves. For example, the optical layer L1 is adapted to reflect the blue beam BBL and allow a green beam BG (i.e. the green beam in the converted beams) and the red beam BR to pass through, and the optical layer L2 is adapted to reflect the red beam BR and allow the green beam BG (i.e. the green beam in the converted beams) to pass through.

In the embodiment, by using the display device 11 to perform color separation, the three light sources (the blue light source 125, the laser light source 100 and the red light source 123 shown in FIG. 11A to FIG. 11C) may be turned on at the same time.

It should be noted that, the display device used by the projection apparatus of the invention is not limited to the display device 11 shown in FIG. 12A to FIG. 12C. In other embodiments, the number of the light valves in the display device used by the projection apparatus may be one (as shown in FIG. 13A to FIG. 13C) or two (as shown in FIG. 14A to FIG. 14C).

Figure 13A:
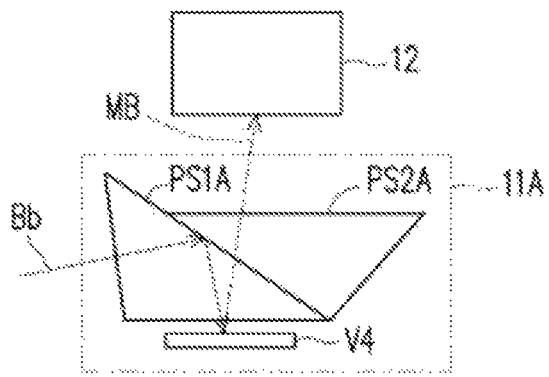
FIG. 13A to FIG. 13C are enlarged views of a display device and a projection lens applied to the embodiments of the invention, which respectively illustrate transmission paths of a blue beam, a green beam and a red beam.
Figure 13B:
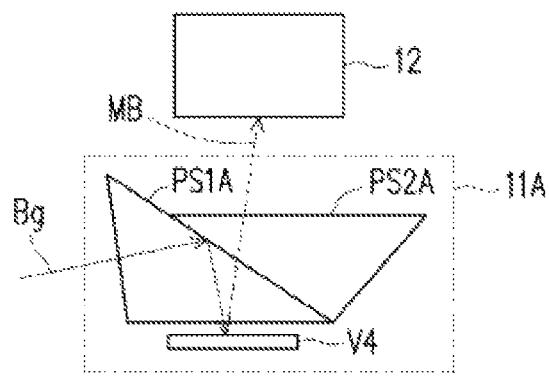
Figure 13C:
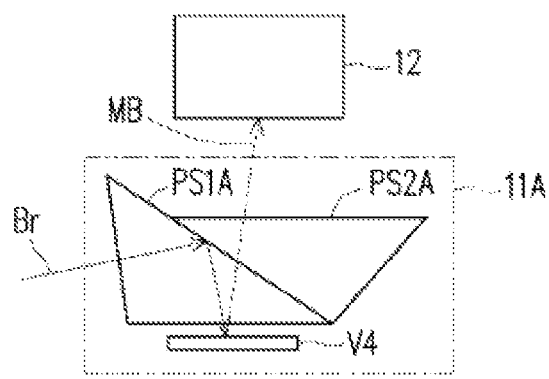
Figure 14A:
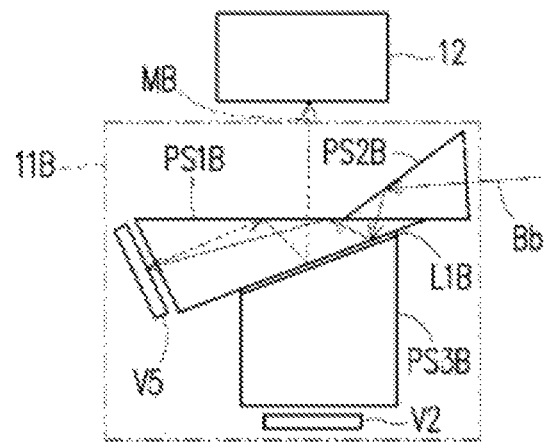
FIG. 14A to FIG. 14C are enlarged views of another implementation of a display device and a projection lens applied to the embodiments of the invention, which respectively illustrate transmission paths of a blue beam, a green beam and a red beam.
Figure 14B:
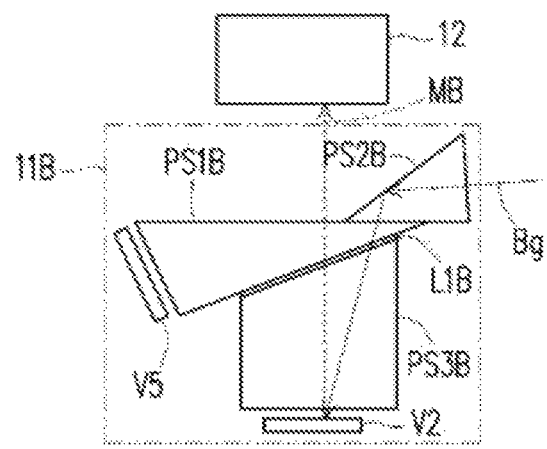
Figure 14C:
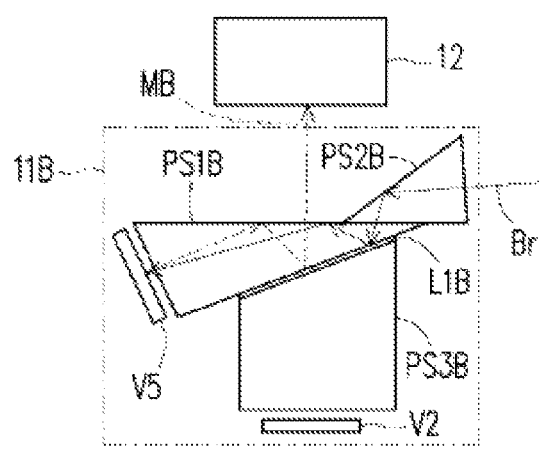

FIG. 13A to FIG. 13C are enlarged views of a display device and a projection lens applied to the embodiments of the invention, which respectively illustrate transmission paths of a blue beam Bb, a green beam Bg and a red beam Br. Referring to FIG. 13A to FIG. 13C, a display device 11A may include a light valve (for example, a light valve V4) and a plurality of prisms (for example, a prism PS1A and a prism PS2A).

The light valve V4 is used for converting the blue beam Bb, the green beam Bg and the red beam Br into the image beam MB. For example, the light valve V4 may be a LCD panel, a LCOS panel or a DMD, though the invention is not limited thereto.

The plurality of prisms are used for guiding light beams of different colors to the light valve V4. In the embodiment, the light beams of different colors are basically transmitted to the light valve V4 along the same path.

Under the framework that the number of the light valves in the display device 11A is only one, the projection apparatus may use the filter module to perform color separation. Under such framework, the blue beam Bb is, for example, originated from the excitation beam coming from the excitation light source. The green beam Bg is, for example, originated from the green beam in the converted beam (for example, the yellow beam). The red beam Br is, for example, originated from the red part in the converted beam and/or the red beam coming from the red light source. Moreover, in the light wavelength conversion module, the first converted beam and the second converted beam produced by different phosphor wheels have at least partially overlapped spectra.

FIG. 14A to FIG. 14C are enlarged views of another implementation of a display device and a projection lens applied to the embodiments of the invention, which respectively illustrate transmission paths of the blue beam Bb, the green beam Bg and the red beam Br. Referring to FIG. 14A to FIG. 14C, a display device 11B may include two light valves (for example, a light valve V5 and the light valve V2) and a plurality of prisms (for example, a prism PS1B, a prism PS2B and a prism PS3B) and at least one optical layer (for example, an optical layer L1B).

The light valve V5 is used for converting the blue beam Bb and the red beam Br into the image beam MB. In other words, the blue beam Bb and the red beam Br share the light valve V5. The light valve V2 is used for converting the green beam Bg into the image beam MB. For example, each of the light valves may be a LCD panel, a LCOS panel or a DMD, though the invention is not limited thereto.

The plurality of prisms and the at least one optical layer are used for guiding light beams of different colors to the corresponding light valve. For example, the optical layer L1B is adapted to reflect the blue beam Bb and the red beam Br and allow the green beam Bg to pass through. In the embodiment, the blue beam Bb and the red beam Br are basically transmitted to the light valve V5 along the same path, and the green beam Bg is transmitted to the light valve V2 along a path different to the path of the blue beam Bb and the red beam Br.

Under the framework that the number of the light valves in the display device 11B is only two, the projection apparatus may use the filter module to perform color separation. Under such framework, the blue beam Bb is, for example, originated from the excitation beam coming from the excitation light source. The green beam Bg is, for example, originated from the green beam in the converted beam (for example, the yellow beam). The red beam Br is, for example, originated from the red part in the converted beam and/or the red beam coming from the red light source. Moreover, in the light wavelength conversion module, the first converted beam and the second converted beam produced by different phosphor wheels have at least partially overlapped spectra. Alternatively, the color separation may be performed without the need of the filter module by the light conversion region and the non-light conversion region of the light wavelength conversion module being alternately cut into the transmission path of the light beam (referring to descriptions of FIG. 9A to FIG. 9C and FIG. 10A to FIG. 10C).

In summary, the embodiments of the invention have at least one of following advantages and effects. In the embodiments of the illumination system and the projection apparatus of the invention, a plurality of phosphor wheels are all disposed on the transmission path of the excitation beam coming from the excitation light source, such that the excitation beam received by each of the phosphor wheels is only a part of rather than all of the excitation beam coming from the excitation light source (i.e. an irradiation area of the excitation beam on each of the phosphor wheels is smaller than a total irradiation area of the excitation beam, and the energy of the excitation beam received by each of the phosphor wheels is smaller than the energy of the excitation beam coming from the excitation light source), so as to decrease the energy of the light spot projected on each of the phosphor wheels. Therefore, the illumination system may improve the phosphor conversion efficiency and avoid burning the phosphor powder, and the projection apparatus has good performance. Moreover, since the energy of the light spot on each of the phosphor wheels may be effectively decreased, the excitation light source in the illumination system may adopt a high-power excitation light source. Furthermore, compared to the method of adopting two illumination systems to reduce the energy of the light spot, the illumination system of the invention may simplify an optical design framework and reduce the number of required components. In an embodiment, the light loss caused by the gap between the two phosphor wheels may be reduced by configuring a multidirectional element, rotating the light-emitting unit, rotating the reflecting element or partially overlapping the two phosphor wheels in the radial direction. In another embodiment, the shape and/or energy distribution of the light spot projected on each of the phosphor wheels may be adjusted by configuring at least one light diffusing element or a light spot shaping element. In still another embodiment, the illumination system may further include a red light source and/or a blue light source according to an actual requirement. In addition, the projection apparatus may adopt the display device including one or a plurality of light valves according to an actual requirement.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an illumination system, comprising:
      an excitation light source, adapted to provide an excitation beam; and
      a light wavelength conversion module, comprising a first phosphor wheel and a second phosphor wheel, wherein the second phosphor wheel is disposed adjacent to the first phosphor wheel, the first phosphor wheel and the second phosphor wheel are located on a same reference plane facing the excitation light source, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam;
   a display device, disposed on a transmission path of an illumination beam output from the illumination system, and converting the illumination beam into an image beam; and
   a projection lens, disposed on a transmission path of the image beam.

2. The projection apparatus as claimed in claim 1, wherein the illumination system further comprises:
   a multidirectional element, disposed on a transmission path of the excitation beam coming from the excitation light source and located between the excitation light source and the light wavelength conversion module, wherein the multidirectional element has a curved surface and a multidirectional plane, the multidirectional plane and the curved surface are opposite to each other, the multidirectional plane comprises a plurality of sub-planes facing different directions, and the excitation beam coming from the excitation light source is separated into a plurality of sub-beams by the sub-planes.

3. The projection apparatus as claimed in claim 2, wherein the illumination system further comprises:
   a light diffusing element, disposed on a transmission path of the excitation beam coming from the multidirectional element and located between the multidirectional element and the light wavelength conversion module.

4. The projection apparatus as claimed in claim 2, wherein the excitation light source comprises a first light-emitting unit and a second light-emitting unit, the first light-emitting unit emits a first sub-beam, the second light-emitting unit emits a second sub-beam, and the multidirectional element is disposed on transmission paths of the first sub-beam and the second sub-beam, wherein the first sub-beam passes through a first part of sub-planes in the plurality of sub-planes, and the second sub-beam passes through a second part of sub-planes in the plurality of sub-planes, and the illumination system further comprises:
   a first light diffusing element, disposed on a transmission path of the first sub-beam coming from the first part of sub-planes and located between the multidirectional element and the light wavelength conversion module; and
   a second light diffusing element, disposed on a transmission path of the second sub-beam coming from the second part of sub-planes and located between the multidirectional element and the light wavelength conversion module, wherein the first light diffusing element and the second light diffusing element have different light diffusing effects.

5. The projection apparatus as claimed in claim 1, wherein the illumination system further comprises:
   a light spot shaping element, disposed on a transmission path of the excitation beam coming from the excitation light source and located between the excitation light source and the light wavelength conversion module.

6. The projection apparatus as claimed in claim 1, wherein the excitation light source comprises a first light-emitting unit and a second light-emitting unit, the first light-emitting unit emits a first sub-beam, the first part of the excitation beam is originated from the first sub-beam, the second light-emitting unit emits a second sub-beam, the second part of the excitation beam is originated from the second sub-beam, wherein the first light-emitting unit is tilt relative to the first phosphor wheel, and the second light-emitting unit is tilt relative to the second phosphor wheel.

7. The projection apparatus as claimed in claim 1, wherein the excitation light source comprises a first light-emitting unit and a second light-emitting unit, the first light-emitting unit emits a first sub-beam, the first part of the excitation beam is originated from the first sub-beam, the second light-emitting unit emits a second sub-beam, the second part of the excitation beam is originated from the second sub-beam, and the illumination system further comprises:
a first reflecting element, disposed on a transmission path of the first sub-beam and located between the first light-emitting unit and the light wavelength conversion module; and
a second reflecting element, disposed on a transmission path of the second sub-beam and located between the second light-emitting unit and the light wavelength conversion module, wherein the first reflecting element is tilt relative to the first phosphor wheel, and the second reflecting element is tilt relative to the second phosphor wheel, such that a plurality of light spots projected on the first phosphor wheel and the second phosphor wheel are separated from each other.

8. The projection apparatus as claimed in claim 1, wherein the first phosphor wheel and the second phosphor wheel are partially overlapped, and an overlapped width of the first phosphor wheel and the second phosphor wheel in a radial direction is smaller than a radial width of a light conversion region of the first phosphor wheel and a radial width of a light conversion region of the second phosphor wheel, such that the light conversion region of the first phosphor wheel and the light conversion region of the second phosphor wheel are both irradiated by the excitation beam.

9. The projection apparatus as claimed in claim 1, wherein the display device comprises one or two light valves, each of the first phosphor wheel and the second phosphor wheel comprises a light conversion region and a non-light conversion region, wherein
the light conversion region of the first phosphor wheel and the light conversion region of the second phosphor wheel are synchronously cut into the transmission paths of the first part and the second part of the excitation beam, and the non-light conversion region of the first phosphor wheel and the non-light conversion region of the second phosphor wheel are synchronously cut into the transmission paths of the first part and the second part of the excitation beam;
the light conversion region of the first phosphor wheel converts the first part into a first converted beam, the light conversion region of the second phosphor wheel converts the second part into a second converted beam, and the first converted beam and the second converted beam have at least partially overlapped spectra; and
the illumination system further comprises:
a filter module, disposed on transmission paths of the first converted beam and the second converted beam coming from the light wavelength conversion module.

10. The projection apparatus as claimed in claim 1, wherein the display device comprises two light valves, the illumination system does not comprise a filter module, and each of the first phosphor wheel and the second phosphor wheel comprises a light conversion region and a non-light conversion region, wherein
the light conversion region of the first phosphor wheel and the light conversion region of the second phosphor wheel are synchronously cut into the transmission paths of the first part and the second part of the excitation beam, and the non-light conversion region of the first phosphor wheel and the non-light conversion region of the second phosphor wheel are synchronously cut into the transmission paths of the first part and the second part of the excitation beam;
the light conversion region of the first phosphor wheel converts the first part of the excitation beam into a first converted beam, the light conversion region of the second phosphor wheel converts the second part of the excitation beam into a second converted beam, and the first converted beam and the second converted beam have the same color; and
the illumination system further comprises:
a red light source, adapted to provide a red beam.

11. The projection apparatus as claimed in claim 1, wherein the display device comprises three light valves, each of the first phosphor wheel and the second phosphor wheel comprises a light conversion region, wherein
the light conversion region of the first phosphor wheel converts the first part of the excitation beam into a first converted beam, the light conversion region of the second phosphor wheel converts the second part of the excitation beam into a second converted beam, and the first converted beam and the second converted beam have the same color; and
the illumination system further comprises:
a blue light source; and
a red light source, wherein the excitation light source, the blue light source and the red light source are simultaneously turned on.

12. An illumination system, comprising:
an excitation light source, adapted to provide an excitation beam; and
a light wavelength conversion module, comprising a first phosphor wheel and a second phosphor wheel, wherein the second phosphor wheel is disposed adjacent to the first phosphor wheel, the first phosphor wheel and the second phosphor wheel are located on a same reference plane facing the excitation light source, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam.

13. The illumination system as claimed in claim 12, further comprising:
a multidirectional element, disposed on a transmission path of the excitation beam coming from the excitation light source and located between the excitation light source and the light wavelength conversion module, wherein the multidirectional element has a curved surface and a multidirectional plane, the multidirectional plane and the curved surface are opposite to each other, the multidirectional plane comprises a plurality of sub-planes facing different directions, and the excitation beam coming from the excitation light source is separated into a plurality of sub-beams by the sub-planes.

14. The illumination system as claimed in claim 13, further comprising:
a light diffusing element, disposed on a transmission path of the excitation beam coming from the multidirectional element and located between the multidirectional element and the light wavelength conversion module.

15. The illumination system as claimed in claim 13, wherein the excitation light source comprises a first light-emitting unit and a second light-emitting unit, the first light-emitting unit emits a first sub-beam, the second light-emitting unit emits a second sub-beam, and the multidirectional element is disposed on transmission paths of the first sub-beam and the second sub-beam, wherein the first sub-beam passes through a first part of sub-planes in the plurality of sub-planes, and the second sub-beam passes through a second part of sub-planes in the plurality of sub-planes, and the illumination system further comprises:
a first light diffusing element, disposed on a transmission path of the first sub-beam coming from the first part of sub-planes and located between the multidirectional element and the light wavelength conversion module; and
a second light diffusing element, disposed on a transmission path of the second sub-beam coming from the second part of sub-planes and located between the multidirectional element and the light wavelength conversion module, wherein the first light diffusing element and the second light diffusing element have different light diffusing effects.

16. The illumination system as claimed in claim 12, further comprising:
a light spot shaping element, disposed on a transmission path of the excitation beam coming from the excitation light source and located between the excitation light source and the light wavelength conversion module.

17. The illumination system as claimed in claim 12, wherein the excitation light source comprises a first light-emitting unit and a second light-emitting unit, the first light-emitting unit emits a first sub-beam, the first part of the excitation beam is originated from the first sub-beam, the second light-emitting unit emits a second sub-beam, the second part of the excitation beam is originated from the second sub-beam, wherein the first light-emitting unit is tilt relative to the first phosphor wheel, and the second light-emitting unit is tilt relative to the second phosphor wheel.

18. An illumination system, comprising:
an excitation light source, adapted to provide an excitation beam; and
a light wavelength conversion module, comprising a first phosphor wheel and a second phosphor wheel, wherein the second phosphor wheel is disposed adjacent to the first phosphor wheel, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam,
wherein the excitation light source comprises a first light-emitting unit and a second light-emitting unit, the first light-emitting unit emits a first sub-beam, the first part of the excitation beam is originated from the first sub-beam, the second light-emitting unit emits a second sub-beam, the second part of the excitation beam is originated from the second sub-beam, and the illumination system further comprises:
a first reflecting element, disposed on a transmission path of the first sub-beam and located between the first light-emitting unit and the light wavelength conversion module; and
a second reflecting element, disposed on a transmission path of the second sub-beam and located between the second light-emitting unit and the light wavelength conversion module, wherein the first reflecting element is tilt relative to the first phosphor wheel, and the second reflecting element is tilt relative to the second phosphor wheel, such that a plurality of light spots projected on the first phosphor wheel and the second phosphor wheel are separated from each other.

19. The illumination system as claimed in claim 12, wherein the first phosphor wheel and the second phosphor wheel are partially overlapped, and an overlapped width of the first phosphor wheel and the second phosphor wheel in a radial direction is smaller than a radial width of a light conversion region of the first phosphor wheel and a radial width of a light conversion region of the second phosphor wheel, such that the light conversion region of the first phosphor wheel and the light conversion region of the second phosphor wheel are both irradiated by the excitation beam.

20. An illumination system, comprising:
an excitation light source, adapted to provide an excitation beam; and
a light wavelength conversion module, comprising a first phosphor wheel and a second phosphor wheel, wherein the second phosphor wheel is disposed adjacent to the first phosphor wheel, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam, wherein each of the first phosphor wheel and the second phosphor wheel comprises a light conversion region and a non-light conversion region, wherein
the light conversion region of the first phosphor wheel and the light conversion region of the second phosphor wheel are synchronously cut into the transmission paths of the first part and the second part of the excitation beam, and the non-light conversion region of the first phosphor wheel and the non-light conversion region of the second phosphor wheel are synchronously cut into the transmission paths of the first part and the second part of the excitation beam;
the light conversion region of the first phosphor wheel converts the first part into a first converted beam, the light conversion region of the second phosphor wheel converts the second part into a second converted beam, and the first converted beam and the second converted beam have at least partially overlapped spectra; and
the illumination system further comprises:
a filter module, disposed on transmission paths of the first converted beam and the second converted beam coming from the light wavelength conversion module.

21. An illumination system, comprising:
an excitation light source, adapted to provide an excitation beam; and
a light wavelength conversion module, comprising a first phosphor wheel and a second phosphor wheel, wherein the second phosphor wheel is disposed adjacent to the first phosphor wheel, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam, wherein the illumination system does not comprise a filter module, and each of the first phosphor wheel and the second phosphor wheel comprises a light conversion region and a non-light conversion region, wherein
the light conversion region of the first phosphor wheel and the light conversion region of the second phosphor wheel are synchronously cut into the transmission paths of the first part and the second part of the excitation beam, and the non-light conversion region of the first phosphor wheel and the non-light conversion region of the second phosphor wheel are synchronously cut into the transmission paths of the first part and the second part of the excitation beam;

the light conversion region of the first phosphor wheel converts the first part of the excitation beam into a first converted beam, the light conversion region of the second phosphor wheel converts the second part of the excitation beam into a second converted beam, and the first converted beam and the second converted beam have the same color; and the illumination system further comprises:

a red light source, adapted to provide a red beam.

22. The illumination system as claimed in claim 12, An illumination system, comprising:

an excitation light source, adapted to provide an excitation beam; and a light wavelength conversion module, comprising a first phosphor wheel and a second phosphor wheel, wherein the second phosphor wheel is disposed adjacent to the first phosphor wheel, and the first phosphor wheel and the second phosphor wheel are respectively disposed on transmission paths of a first part and a second part of the excitation beam, such that during a period that the excitation light source is turned on, the first phosphor wheel and the second phosphor wheel are both irradiated by the excitation beam, wherein each of the first phosphor wheel and the second phosphor wheel comprises a light conversion region, wherein the light conversion region of the first phosphor wheel converts the first part of the excitation beam into a first converted beam, the light conversion region of the second phosphor wheel converts the second part of the excitation beam into a second converted beam, and the first converted beam and the second converted beam have the same color; and the illumination system further comprises:

a blue light source; and a red light source, wherein the excitation light source, the blue light source and the red light source are simultaneously turned on.

* * * * *